(12) United States Patent
Saeki et al.

(10) Patent No.: US 8,465,372 B2
(45) Date of Patent: Jun. 18, 2013

(54) TORQUE FLUCTUATION ABSORBING APPARATUS

(75) Inventors: Tomohiro Saeki, Anjo (JP); Satoshi Nakagaito, Kariya (JP); Toshiyuki Saburi, Nagoya (JP); Masanori Suzuki, Kariya (JP); Hiroaki Suezaki, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 432 days.

(21) Appl. No.: 12/729,919

(22) Filed: Mar. 23, 2010

(65) Prior Publication Data

US 2010/0243399 A1  Sep. 30, 2010

(30) Foreign Application Priority Data

Mar. 24, 2009 (JP) .................... 2009-072837

(51) Int. Cl.
*F16F 15/129* (2006.01)
(52) U.S. Cl.
USPC .................... 464/68.4; 464/68.6; 192/214
(58) Field of Classification Search
USPC   464/68.1, 68.4, 68.41, 68.5, 68.6; 192/70.17, 192/214, 214.1
See application file for complete search history.

(56) References Cited

U.S. PATENT DOCUMENTS

| | | | | |
|---|---|---|---|---|
| 5,368,146 A | * | 11/1994 | Kohno et al. | 192/70.16 |
| 5,836,216 A | * | 11/1998 | Sudau et al. | 464/68.1 X |
| 5,878,856 A | * | 3/1999 | Sudau et al. | 192/70.17 |
| 6,129,192 A | * | 10/2000 | Jackel et al. | 192/70.17 |
| 6,213,270 B1 | * | 4/2001 | Jackel et al. | 192/70.17 |
| 6,299,541 B1 | * | 10/2001 | Bertin et al. | 192/70.17 X |
| 6,582,312 B2 | | 6/2003 | Suzuki | |
| 7,134,963 B2 | * | 11/2006 | Tsuruta et al. | 464/68.41 |
| 7,195,111 B2 | * | 3/2007 | Fukushima | 192/70.17 |
| 8,210,950 B2 | * | 7/2012 | Nakagaito et al. | 464/68.41 X |
| 2002/0019262 A1 | | 2/2002 | Suzuki | |
| 2004/0082392 A1 | * | 4/2004 | Fukushima et al. | |

FOREIGN PATENT DOCUMENTS

JP   2002-039210 A   2/2002

* cited by examiner

*Primary Examiner* — Gregory Binda
*Assistant Examiner* — Matthieu Setliff
(74) *Attorney, Agent, or Firm* — Buchanan Ingersoll & Rooney P.C.

(57) ABSTRACT

The torque fluctuation absorber includes a flywheel fixed on a first rotating shaft by a fixation member, a damper unit connected with a second rotating shaft and absorbs fluctuation of torque occurred between the first rotating shaft and the second rotating shaft by elastic force, and a limiter unit provided on a power transmission path between the flywheel and the damper unit and inducing a slide when the fluctuation of the torque exceeded a predetermined value. A predetermined member rotates with the first rotating shaft on a power transmission path between the first rotating shaft and the limiter unit. The predetermined member has a side plate at the damper unit and a guide portion that prevents movement radially of a hub member, and the guide portion is provided at radially internal side of the fixation member.

8 Claims, 33 Drawing Sheets

TORQUE FLUCTUATION ABSORBING APPARATUS

CROSS REFERENCE TO RELATED APPLICATIONS

This application is based on and claims priority under Paris Convention of Japanese Patent Application No. 2009-072837 filed on Mar. 24, 2009, the entire content of which is incorporated herein by reference.

TECHNICAL FIELD

This disclosure relates to a torque fluctuation absorber that absorbs torque fluctuation between rotating shafts and particularly, this disclosure relates to a torque fluctuation absorber having a structure to reduce or suppress eccentricity (offset of centricity).

BACKGROUND

A torque fluctuation absorber is arranged, for example, on a power transmission path between an engine and a motor and absorbs (suppresses) a torque fluctuation between the engine and the motor. A torque fluctuation absorber may comprise a damper unit to absorb a torque fluctuation by a spring power, a hysteresis unit to absorb (suppress) a torque fluctuation by a hysteresis torque such as a friction and a limiter unit to induce a slide when a torsion of a rotating shaft exceeded an absorption capacity of the damper unit or hysteresis unit. Since a torque fluctuation absorber has a plate unfixed or unengaged with respect to a rotating shaft of an engine (crank shaft), rotating shaft of a motor or a piece fixed or engaged therewith, the torque fluctuation absorber has a countermeasure to reduce eccentricity of the plate.

For example, a structure disclosed in FIG. 1 of Patent Document 1 reduces eccentricity of a drive plate (21) by providing a bush (54) that supports the drive plate and a flywheel (10) in a relatively rotatable manner at a gap portion in a radial direction between the drive plate and the flywheel connected with a crank shaft (2) (structure 1).

A structure disclosed in FIG. 2 of Patent Document 1 reduces eccentricity of a drive plate (21) by providing a bush (54) that supports the drive plate and a damper cover (32) in a relatively rotatable manner at a gap portion in a radial direction between the drive plate and the damper cover connected with a crank shaft (2) via a flywheel (10) (structure 2).

A structure disclosed in FIG. 5 of Patent Document 1 reduces eccentricity of a drive plate (21) by arranging a bearing (2b) in a concave portion (2a) at the end of a crank shaft (2) and providing a drive plate supporting member (25) one end of which is fitted into an internal circumference of the bearing and the other end of which is fixed to the drive plate by, for example, welding (structure 3).

In addition, a structure disclosed in FIG. 5 of Patent Document 1 reduces eccentricity of a driven plate (22) by arranging a bearing (2b) in a concave portion (2a) at the end of a crank shaft (2) and providing a driven plate supporting member (26) one end of which is fitted into an internal circumference of the bearing and the other end of which is fixed to the driven plate by, for example, welding (structure 4).

[Patent Document 1]
JP2002-39210A (FIGS. 1, 2 and 5)

SUMMARY

In a first aspect of the present disclosure, there is provided a torque fluctuation absorber comprising a flywheel fixed on a first rotating shaft by a fixation member, a damper unit connected with a second rotating shaft and absorbing fluctuation of a torque occurred between the first rotating shaft and the second rotating shaft by elastic force and a limiter unit provided on a power transmission path between the flywheel and the damper unit and inducing a slide when the fluctuation of the torque exceeded a predetermined value. A predetermined member rotating with the first rotating shaft on a power transmission path between the first rotating shaft and the limiter unit has a guide portion that prevents movement of the damper unit in a transverse direction to a rotating axis (i.e., in a radial direction). The guide portion is provided at radially internal side of the fixation member.

In a second aspect of the present disclosure, there is provided a torque fluctuation absorber comprising a flywheel fixed on a first rotating shaft by fixation member, a damper unit connected with a second rotating shaft and absorbing fluctuation of a torque occurred between the first rotating shaft and the second rotating shaft by elastic force, and a limiter unit provided on a power transmission path between the flywheel and the damper unit and inducing a slide when the fluctuation of the torque exceeded a predetermined value. A predetermined member provided on a power transmission path between the damper unit and the second rotating shaft has a guide portion that prevents movement of the first rotating shaft or the flywheel in a transverse direction to a rotating axis. The guide portion is provided at radially internal side of the fixation member.

DETAILED DESCRIPTION

Figure 1:
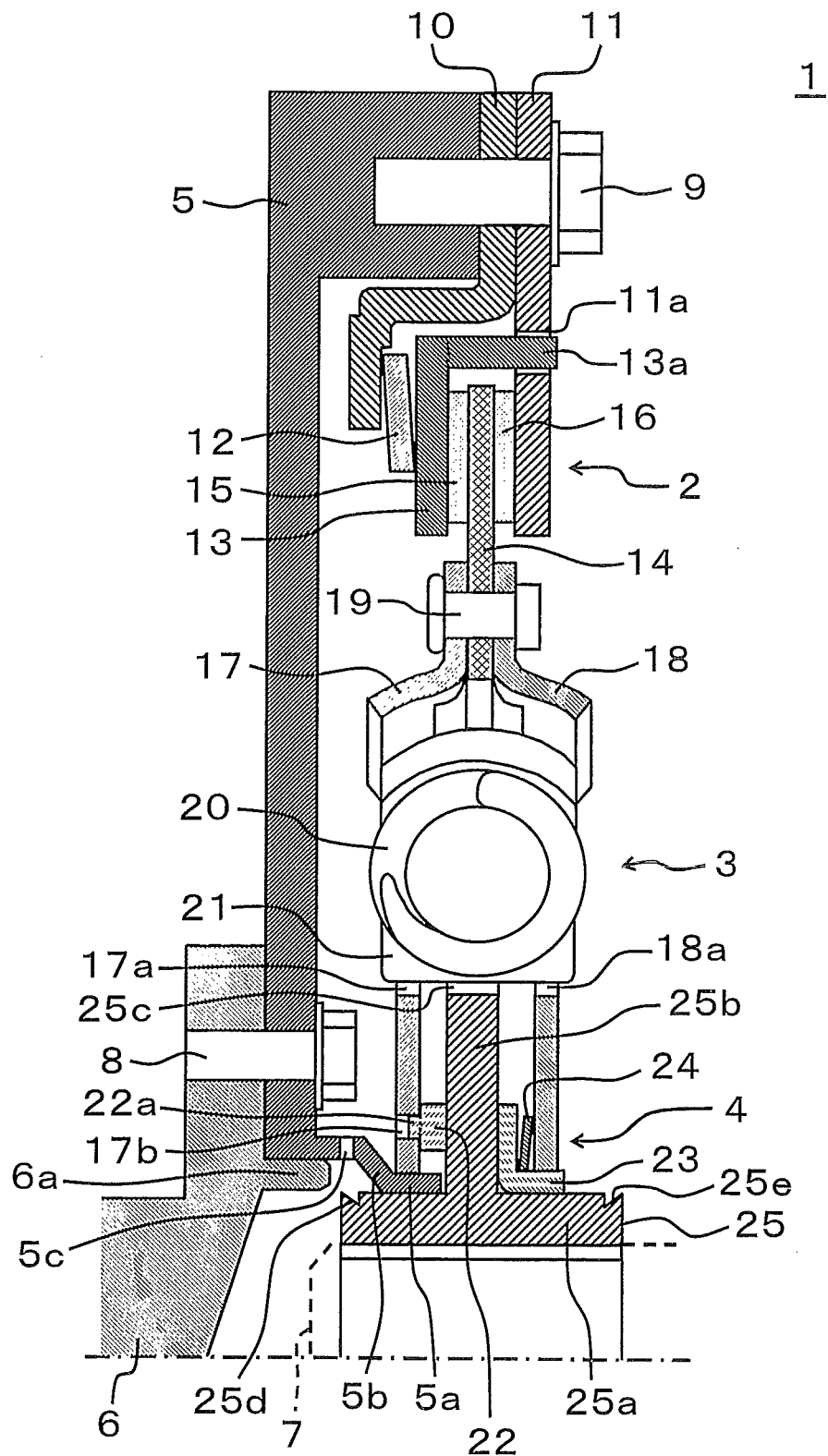
FIG. 1 shows a radial, partial sectional view for illustrating a structure of a torque fluctuation absorber according to example 1.
Figure 2:
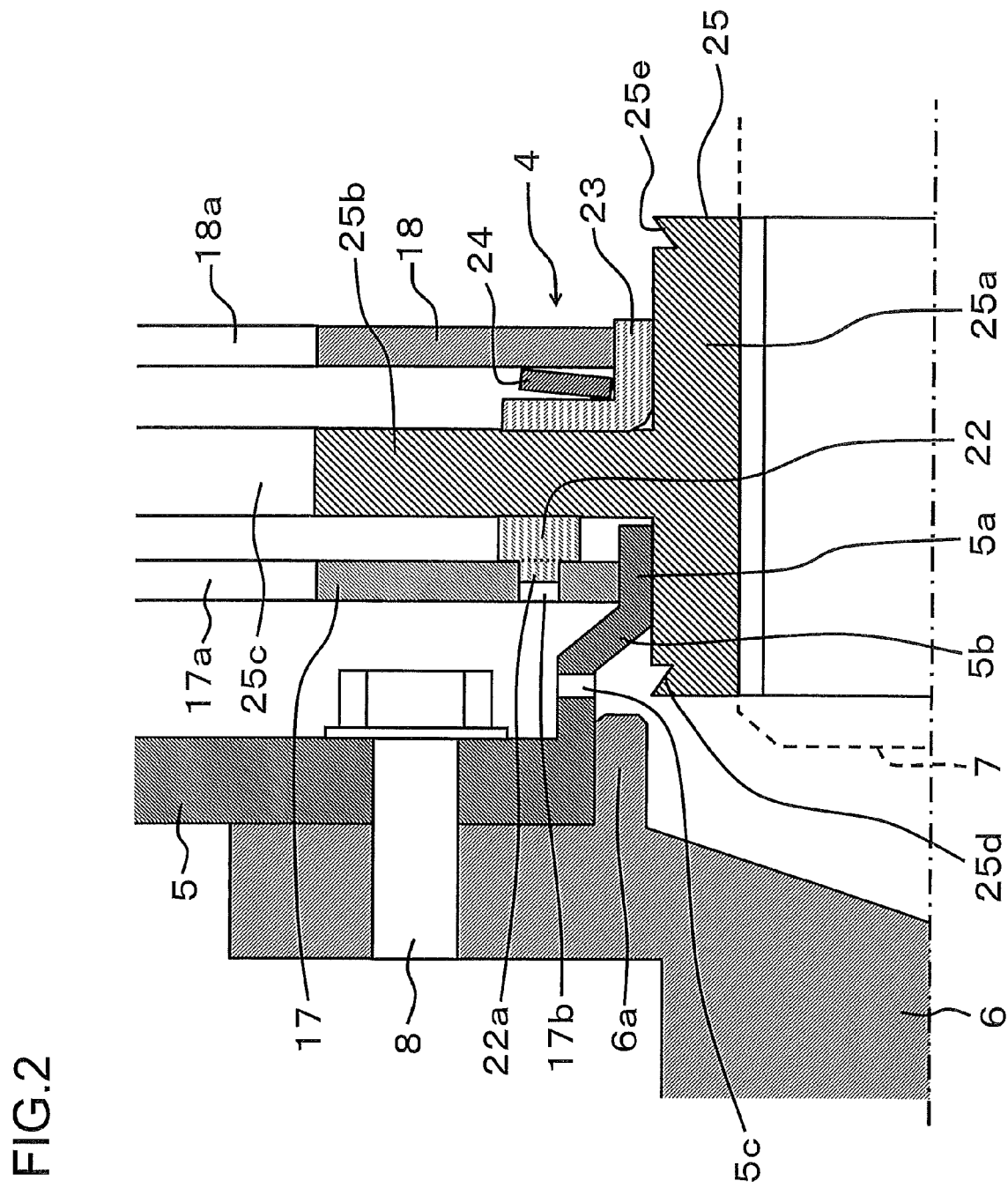
FIG. 2 shows an enlarged partial sectional view for illustrating a structure of a torque fluctuation absorber in FIG. 1 around a center of the shaft according to example 1.

In respect of the structures 1 and 2 disclosed in FIG. 1 and FIG. 2 of JP2002-39210A, an abrasion of the bush may be increased due to a large velocity of a sliding portion of the bush because the bush is arranged at an outer circumferential part of the drive plate. And when the bush is arranged at the outer circumferential part, a radial size of the bush becomes large and it becomes difficult to achieve a high accuracy. In addition, when the bush is arranged at the outer circumferential part, the size of the bush itself becomes large and it causes a big bulk, large amount of materials and a high cost. Further, when the bush is arranged at the outer circumferential part, the bush may tend to be deformed due to large influence of centrifugal force during rotation. In respect of the structure 1, because the bush slides on the flywheel, the bush may melt or be degraded, etc. due to heat transmitted from the engine to the flywheel. In respect of the structure 2, additional pieces may be necessary to hold (attach or fix) the damper cover on the bush, so that a number of pieces may be increased.

Figure 5:
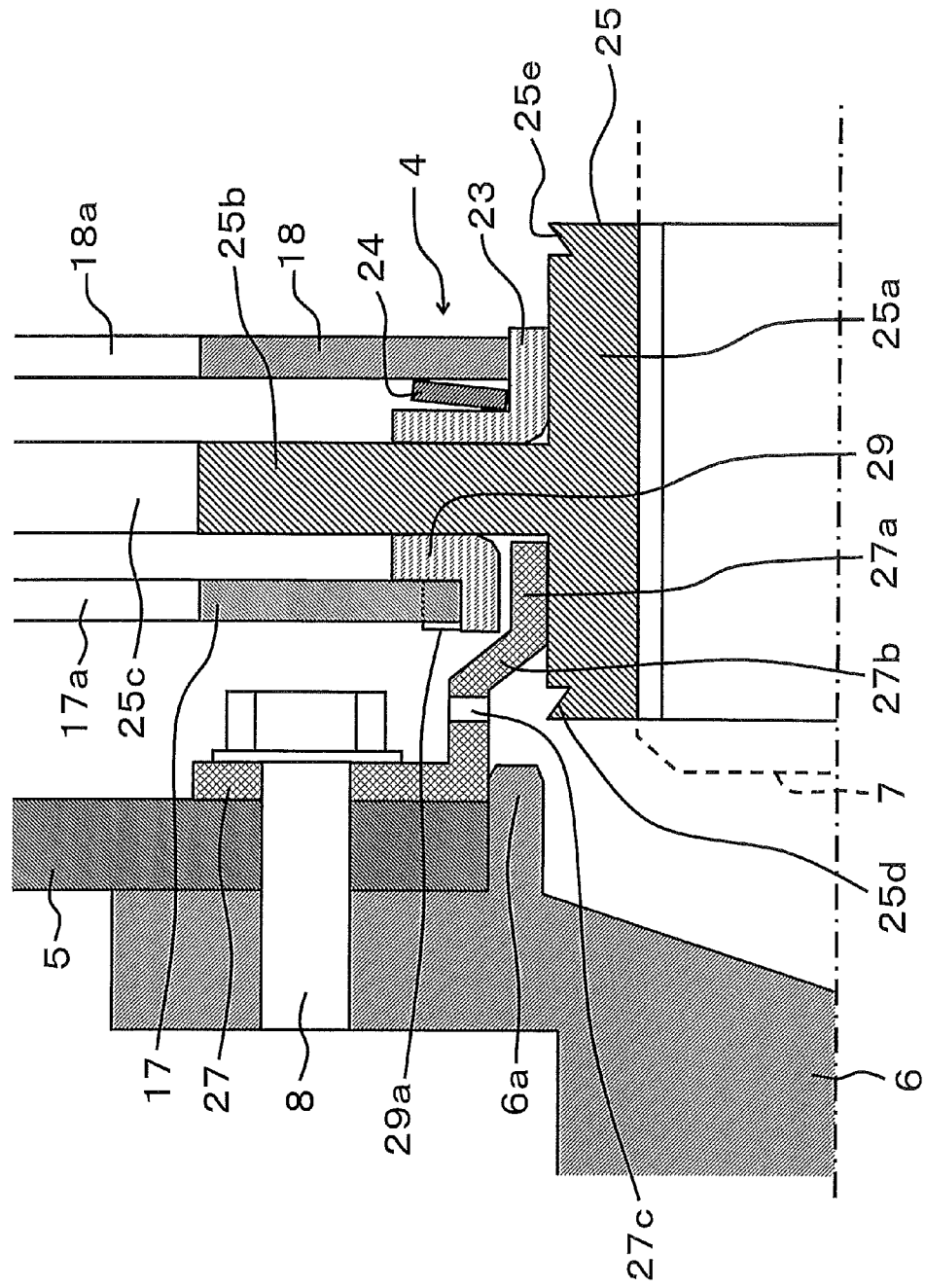
FIG. 5 shows an enlarged partial sectional view for illustrating a structure around a center axis of a shaft of a torque fluctuation absorber according to example 4.

In respect of the structures 3 and 4 disclosed in FIG. 5 of JP2002-39210A, because the bearing is arranged in a concave portion at the end of the crank shaft, additional pieces such as a drive plate support or driven plate support to support the drive plate or driven plate and rivets, etc. are necessary and it may cause costs increasing. And when a bearing is used for supporting a shaft, it may also cause a high cost. Usually a driven input shaft (rotating shaft of a motor) is supported by two points with bearings in a casing. However, the driven input shaft is supported by a three points-support by bearings in the structure 4 because the driven input shaft is supported indirectly by the bearing provided in the concave portion at the end of the crank shaft. Therefore, when unbalanced force occurred at one of the bearings, a lifetime may be decreased due to an unequal abrasion. Usually a hub and the driven input shaft are engaged by a spline connection and the engaged portion is greased. However, the grease scattered from the hub by a centrifugal force during rotation may flow into the sliding portion of the bush with a guide of the drive plate support, and it may cause a degradation of noise vibration characteristics due to a degradation of a hysteresis function of the bush.

In order to solve the aforementioned problem, various modes are possible according to the present disclosure.

Mode 1

Mode 1 corresponds to the first aspect.

Mode 2

According to the first aspect, the predetermined member is the first rotating shaft.

Mode 3

According to the first aspect, the predetermined member is the flywheel.

Mode 4

According to the first aspect, the predetermined member is a piece on an input side of the limiter unit.

Mode 5

According to the first aspect, the piece on an input side of the limiter unit has a hole portion of a diameter larger than a head portion of the fixation member.

Mode 6

According to the first aspect, at least a part of the head portion of the fixation member is inserted into the hole portion.

Mode 7

According to the first aspect, the piece at an input side of the limiter unit has a concave portion avoiding the fixation member.

Mode 8

According to the first aspect, the torque fluctuation absorber has a guide member which is fixed on the first rotating shaft, and the predetermined member is the guide member.

Mode 9

According to the first aspect, the first rotating shaft has a cylindrical elongated portion extending toward the damper unit, and the guide member is attached at an outer or internal circumference of the elongated portion.

Mode 10

According to the first aspect, the torque fluctuation absorber has a guide member which is fixed on the flywheel, and the predetermined member is the guide member.

Mode 11

According to the first aspect, the guide member is fixed to the first rotating shaft by the fixation member with the flywheel so that the guide member is coaxial with the first rotating shaft.

Mode 12

According to the first aspect, the guide member is made of an elastic body.

Mode 13

According to the first aspect, the guide member has a slit or a cavity at the guide portion.

Mode 14

According to the first aspect, the guide member permits a predetermined displacement of the damper unit in a transverse direction to the rotating axis of the predetermined member with generating a resisting force against movement of the damper unit.

Mode 15

According to the first aspect, the damper unit has a plate member connected with the limiter unit, a hub member connected with the second rotating shaft and an elastic member which absorbs fluctuation of the torque occurred between the plate member and the hub member, and the guide portion prevents movement of at least one of the plate member and the hub member in a transverse direction to a rotating axis.

Mode 16

According to the first aspect, the torque fluctuation absorber has a bush located between the guide portion and at least one of the plate member and the hub member.

Mode 17

According to the first aspect, the bush is made of an elastic body.

Mode 18

According to the first aspect, another elastic body of lower elasticity than that of the guide portion is provided between the guide portion and the bush.

Mode 19

According to the first aspect, the torque fluctuation absorber has a hysteresis unit that absorbs the fluctuation of the torque by a frictional force, and the hysteresis unit comprises a thrust member located between the plate member and the hub member and the thrust member serves as the bush.

Mode 20

Mode 20 corresponds to the second aspect.

Mode 21

According to the second aspect, the predetermined member is other than both of a piece of output side of the damper unit and the second rotating shaft and prevents movement of the piece of output side of the damper unit in a transverse direction to the rotating axis.

Mode 22

According to the second aspect, the damper unit has a plate member connected with the limiter unit, a hub member connected with the second rotating shaft and an elastic member absorbing the fluctuation of the torque occurred between the plate member and the hub member, and the predetermined member is the plate member.

Mode 23

According to the second aspect, the torque fluctuation absorber has a hysteresis unit which absorbs the fluctuation of the torque occurred between the first rotating shaft and the second rotating shaft by a hysteresis torque. The damper unit has a plate member connected with the limiter unit, a hub member connected with the second rotating shaft and an elastic member which absorbs the fluctuation of the torque occurred between the plate member and the hub member. The hysteresis unit has a thrust member located between the plate member and the hub member and is slidable against at least the hub member. The predetermined member is the thrust member.

Mode 24

According to the second aspect, the first rotating shaft has a cylindrical elongated portion extending toward the damper unit. The guide portion is located between the elongated portion and the hub member.

Mode 25

According to the second aspect, the guide portion has a groove portion formed in succession from the end portion to beyond a position facing to the elongated portion on the outer circumferential surface.

Mode 26

According to the second aspect, the first rotating shaft has a cylindrical elongated portion extending toward the damper unit. The second rotating shaft has another elongated portion extending toward the first rotating shaft. The guide portion is located between the elongated portion and the another elongated portion.

Mode 27

According to the second aspect, the damper unit has a plate member connected with the limiter unit, a hub member connected with the second rotating shaft and an elastic member which absorbs the fluctuation of the torque occurred between the plate member and the hub member. A guide member is attached on an internal circumference of the hub member and the predetermined member is the guide member.

Mode 28

According to the second aspect, the predetermined member is made of an elastic body.

Mode 29

According to the second aspect, the predetermined member permits a predetermined displacement of the first rotating shaft or the flywheel in a transverse direction to the rotating axis with generating a resisting force at the guide portion against the movement of the first rotating shaft or the flywheel.

Mode 30

According to the second aspect, a bush located between the guide portion and the first rotating shaft or the flywheel is provided.

Mode 31

According to the second aspect, the bush is made of an elastic body.

Mode 32

According to the second aspect, the other elastic body of a lower elasticity than that of the guide portion is provided between the guide portion and the bush.

Mode 33

According to the first aspect or the second aspect, the guide portion is formed cylindrically and provided with a penetration hole portion.

Mode 34

According to the first aspect or the second aspect, the penetration hole portion inclines so as to be apart from the damper unit as it goes from an internal circumference to outer circumference.

Mode 35

According to the first aspect or the second aspect, the guide portion has a groove portion formed on an internal circumferential surface in a circumferential direction and the penetration hole portion is formed in an area where the groove portion is formed.

Mode 36

According to the first aspect or the second aspect, the guide portion has a tapered portion or a step portion that increases in diameter in accordance with a position from the damper unit to the flywheel at the damper unit side from the penetration hole portion.

Mode 37

According to the first aspect or the second aspect, the damper unit has a plate member connected with the limiter unit, a hub member connected with the second rotating shaft and an elastic member absorbing fluctuation of the torque occurred between the plate member and the hub member. The hub member has a cylindrical hub portion. The hub portion engages with the second rotating shaft unrotatably at radially internal side and a lid member to cover an opening of the first rotating shaft is attached.

Mode 38

According to the first aspect or the second aspect, an axial dimension of the lid member is larger than that of an axial gap between the first rotating shaft and the hub portion.

Various meritorious effects are achieved according the aspects of the present disclosure.

According to the present disclosure, because movement of a prescribed member of a damper unit in radial direction is prevented by a guide portion, it is possible to reduce or suppress an eccentric load on bearings of a first rotating shaft and a second rotating shaft. Because the guide portion as a bearing portion is arranged on radially internal side of a fixation member, it is possible to reduce a size of the bearing portion in diameter. Because additional pieces (rivet(s), etc.) for the guide portion are unnecessary or materials for the guide portion can be reduced due to its small size in diameter and there is no need for a bearing, fabrication costs can be reduced. Because hub grease can be guided so as to be apart from a hysteresis unit by providing a tapered portion, a penetration hole, etc. at the guide portion, characteristics of the hysteresis unit can be stabilized. And by using an elastic body for the guide portion and permitting a predetermined displacement by providing a cavity or a slit, it is possible to prevent reduction of lifetime of a bearing supporting a second shaft of an output side.

EXAMPLE 1

A torque fluctuation absorber according to example 1 of the present disclosure will be explained with reference to drawings. FIG. 1 shows a radial, partial sectional view for illustrating a structure of a torque fluctuation absorber according to example 1 of the present disclosure. And FIG. 2 shows an enlarged partial sectional view for illustrating a structure of a torque fluctuation absorber in FIG. 1 around a center of the shaft.

The torque fluctuation absorber 1 according to example 1 is provided, for example, on a power transmission path between a rotating shaft 6 of an engine side and rotating shaft 7 of a motor side (rotating shaft of a transmission side) and absorbs (suppresses) fluctuation of a torque induced by a torsion of the rotating shaft 6 of an engine side and the rotating shaft 7 of a motor side. The torque fluctuation absorber 1 has a damper unit 3 which has a torsion damping function and absorbs the fluctuation of the torque by elastic force (spring force), a hysteresis unit 4 which absorbs (suppresses) the fluctuation of the torque by a hysteresis torque from friction, and the like and a limiter unit 2 which induces a slide when the torsion of the rotating shafts could not be absorbed by the damper unit 3 or the hysteresis unit 4. The damper unit 3 is arranged in parallel with the hysteresis unit 4 on the power transmission path. The limiter unit 2 is arranged with the damper unit 3 and the hysteresis unit 4 in series on the power transmission path. Particularly, the torque fluctuation absorber 1 may be applied to a hybrid vehicle which may have a problem of resonant vibration between an engine and a motor.

The torque fluctuation absorber 1 is configured such that eccentricity of a side plate 17 and a hub member 25 is suppressed by a guide portion 5a of a flywheel 5. The torque fluctuation absorber 1 has the flywheel 5, a bolt 9, a support plate 10, a cover plate 11, a dish spring 12, a pressure plate 13, a lining plate 14, friction materials 15 and 16, a side plate 17, a side plate 18, a rivet 19, a coil spring 20, a sheet member 21, a thrust member 2, a dish (annular conical) spring 24 and a hub member 25 as structural elements.

The flywheel 5 is an annular member which is arranged at an outer circumference of an elongated portion 6a of the rotating shaft 6 of engine side such that its shaft is aligned with the rotating shaft. The flywheel 5 is held at its internal circumferential part on the rotating shaft 6 of an engine side by a bolt 8. The support plate 10 and the cover plate 11 are held by the bolt 9 on a cylindrical portion extending from a surface, which faces to the damper unit 3, in the vicinity of outer circumferential edge of the flywheel 5. The flywheel 5 has the guide portion 5a extending from more internal portion (smaller radius portion) than the bolt 8 toward the hub member 25. A portion around the end of the guide portion 5a is arranged between an internal circumferential end surface of the side plate 17 and an outer circumferential surface of a hub portion 25a of the hub member 25. The guide portion 5a is in contact with the side plate 17 and the hub portion 25a such that the guide portion 5a supports the side plate 17 and the hub member 25 rotatably and suppresses eccentricity of the side plate 17 and the hub member 25. The guide portion 5a has a tapered portion 5b (or stepped portion is also possible), at its middle portion, that inclines so as to be apart from the side plate 17 (that is, gradually increased in radius) as it goes toward outer circumference. The tapered portion 5b has a function to turn away grease, which is applied at a spline-engaging portion of the hub portion 25a and the rotating shaft 7 of motor side, from the hysteresis unit 4 when the grease is dispersed by a centrifugal force. The guide portion 5a has at least one penetration hole portion 5c at a large radius portion in the vicinity of the end portion. The penetration hole portion 5c is a hole to discharge the grease guided to internal circumference by the tapered portion 5b to the outer circumferential side. The penetration hole portion 5c may be formed at the tapered portion 5b. A hysteresis function is stabilized and then noise vibration characteristics is stabilized by keeping the grease away from the hysteresis unit 4 by the tapered portion 5b and the penetration hole portion 5c.

The support plate 10 is an annular member arranged between the flywheel 5 and the cover plate 11 and a structural member of the limiter unit 2. The support plate 10 is held on the flywheel 5 by the bolt 9 at an outer circumference thereof with the cover plate 11. The internal circumferential part of the support plate 10 is apart from the cover plate 11. The support plate 10 is in contact with a dish spring 12 with pushing force.

The cover plate 11 is an annular member arranged at the opposite side (at a right side in FIG. 1) of the support plate 10 from the flywheel 5 and a structural member of the limiter unit 2. The cover plate 11 is held on the flywheel 5 by the bolt 9 at its outer circumference with the support plate 10. The internal circumferential part of the cover plate 11 is apart from the support plate 10. The cover plate 11 has a hole portion 11a to support pressure plate 13 such that the pressure plate cannot rotate relatively but can move in axial direction. A projecting portion 13a of the pressure plate 13 is inserted in the hole portion 11a such that the pressure plate 13 cannot rotate relatively but can move in axial direction. The cover plate 11 is pressed on the friction material 16 with pushing force at a sliding surface on an internal circumferential part such that the cover plate 11 can slide on the friction material 16.

The dish spring 12 is a spring in a dish shape arranged between the support plate 10 and the pressure plate 13 and is a structural member of the limiter unit 2. The dish spring 12 presses the pressure plate 13 toward the friction material 15.

The pressure plate 13 is an annular member arranged between the dish (annular conical) spring 12 and the friction material 15 and is a structural member of the limiter unit 2. The pressure plate 13 has the projecting portion 13a to be supported by the cover plate 11 such that the pressure plate cannot rotate relatively but can move in axial direction. The projecting portion 13a is inserted in the hole portion 11a of the cover plate 11 such that the pressure plate cannot rotate relatively but can move in axial direction. The pressure plate 13 is biased by the dish spring 12 toward the friction material 15 and is pressed on the friction material 15 on a sliding surface such that the pressure plate 13 can slide on the friction material 15.

The lining plate 14 is an annular member arranged between the cover plate 11 and the pressure plate 13 and is a structural member of the limiter unit 2. The lining plate 14 is sandwiched, at its internal circumference, between the side plate 17 and the side plate 18 and fixed by the rivet 19 with the side plate 17 and the side plate 18. The friction materials 15 and 16 are held on the lining plate 14 by a rivet or adhesive, etc. at an outer circumference of the lining plate 14.

The friction material 15 is a structural member of the limiter unit 2 and arranged between the lining plate 14 and the pressure plate 13. The friction material 15 is structured in an annular shape. The friction material 15 is held on the lining plate 14 with a rivet or an adhesive, etc. The friction material 15 is pressed on the pressure plate 13 with pushing force such that the friction material 15 can slide on the pressure plate 13.

The friction material 16 is a structural member of the limiter unit 2 and arranged between the lining plate 14 and the cover plate 11. The friction material 16 is structured in an annular shape. The friction material 16 is held on the lining plate 14 with a rivet or an adhesive, etc. The friction material 16 is pressed on the cover plate 11 with pushing force such that the friction material 16 can slide on the cover plate 17.

The side plate 17 is an annular member arranged on an engine side (left side in FIG. 1) of a flange portion 25b of the hub member and is a structural member of the damper unit 3 and the hysteresis unit 4. The side plate 17 is fixed with the lining plate 14 and the side plate 18 in the vicinity of outer circumferential end portion by the rivet 19. The side plate 17 has a window portion 17a for receiving the coil spring 20 and the sheet member 21 at the damper unit 3 in the middle portion, and an end surface in circumferential direction of the window portion 17a is in contact with the sheet member 21 such that they can contact or separate each other. The side plate 17 has a hole portion 17b at the hysteresis unit 4 which is located on radially internal side of the damper unit 3 for inserting a protrusion portion 22a of the thrust member 22. The hole portion 17b has a role to prevent a rotation of the thrust member 22 against the side plate 17. An internal circumferential end surface of the side plate 17 is in contact with an outer circumferential surface of a guide portion 5a of the flywheel 5 such that they can rotate against each other, and eccentricity (radial offset) of the side plate 17 is prevented.

The side plate 18 is an annular member arranged on a motor side (right side in FIG. 1) of the flange portion 25b of the hub member 25 and is a structural member of the damper unit 3 and the hysteresis unit 4. The side plate 18 is fixed with the lining plate 14 and the side plate 17 in the vicinity of outer circumferential end portion by the rivet 19. The side plate 18 has a window portion 18a for receiving the coil spring 20 and the sheet member 21 at the damper unit 3 in the middle portion, and an end surface in circumferential direction of the window portion 18a is in contact with the sheet member 21 such that they can contact or separate each other. The side plate 18 supports the dish spring 24 at the hysteresis unit 4 which is located on radially internal side of the damper unit 3. The side plate 18 is supported by the hub member (hub portion 25a) via the thrust member 23 at an internal circumferential end surface such that they can rotate against each other.

The rivet 19 is a piece to bind and fix the lining plate 14, the side plate 17 and the side plate 18.

The coil spring 20 is a structural member of the damper unit 3 and received in the window portions 17a, 18a and 25c formed on the side plates 17, 18 and hub member 25 (flange portion 25b), respectively, and is in contact with the sheet members 21 provided on both edges. The coil spring 20 shrinks when the side plates 17 and 18 and the hub member 25 rotate relatively and absorbs a shock caused by a difference of rotation between the side plates 17 and 18 and the hub member 25. A straight shaped spring or an assembly of bent straight shaped spring may be used as the coil spring 20; however, an arc spring bent along circumference can be used so as to realize a wide twist.

The sheet member 21 is a structural member of the damper unit 3 and received in the window portions 17a, 18a and 25c formed on the side plates 17, 18 and hub member 25 (flange portion 25b), respectively, and arranged between a circumferential end surface of the window portions 17a, 18a and 25c and an end portion of the coil spring 20. A resin material may be used for the sheet member 21 so as to reduce an abrasion of the coil spring 20.

The thrust member 22 is a structural member of the hysteresis unit 4 and an annular member arranged between the side plate 17 and the hub member 25. The thrust member 22 is arranged between the side plate 17 and the flange portion 25b and is in contact with the flange portion 25b with pushing force such that they can slide each other. The thrust member 22 has the protrusion portion 22a for inserting in the hole portion 17b of the side plate 17. The protrusion portion 22a has a role to prevent the thrust member 22 from its rotation against the side plate 17.

The thrust member 23 is a structural member of the hysteresis unit 4 and an annular member arranged between the side plate 18 and the hub member 25. The thrust member 23 is axially arranged between the dish spring 24 and the flange portion 25b, and is pushed toward the flange portion 25b by the dish spring 24 and is in contact with the flange portion 25b such that they can slide each other. The thrust member 23 radially located between the side plate 18 and the hub portion 25a and has a role as a sliding bearing (bush) so as to support the side plate 18 rotatably relative to the hub portion 25a.

The dish spring 24 is a structural member of the hysteresis unit 4 and a dish-like spring that is arranged between the thrust member 23 and the side plate 18 so as to push the thrust member 23 toward the flange portion 25b.

The hub member 25 is a piece to output a rotating power from the damper unit 3 and the hysteresis unit 4 to the motor side and a structural member of the damper unit 3 and the hysteresis unit 4. The hub member 25 has the flange portion 25b protruding from a prescribed portion on an outer circumference of the hub portion 25a. The hub portion 25a engages with the rotating shaft 7 of motor side by a spline on its internal circumferential surface. The hub portion 25a has groove portions 25d and 25e on an outer circumference in the vicinity of both ends in the axial direction of the shaft. The groove portions 25d and 25e has a role to prevent grease from flowing into the hysteresis unit 4 when the grease applied at the spline-engaging portion of the hub portion 25a and the rotating shaft 7 of motor side flowed out by a centrifugal force to both ends in the axial direction of the shaft 7. The grease that is about to flow into the groove portions 25d and 25e is dispersed by the centrifugal force toward outer circumference direction. An outer circumferential surface of the hub portion 25a between the groove portion 25d and the flange portion 25b is in contact with an internal circumferential surface of the guide portion 5a of the flywheel 5, and the hub portion 25a is supported rotatably against the guide portion 5a and thus eccentricity of the hub portion 25a is suppressed by the guide portion 5a. An outer circumferential surface of the hub portion 25a between the groove portion 25e and the flange portion 25b supports the side plate 18 rotatably via the thrust member 23. The flange portion 25b has, at the damper unit 3 in an outer circumferential area, a window portion 25c to receive the coil spring 20 and the sheet member 21, and an end surface in circumferential direction of the window portion 25c is in contact with the sheet member 21 such that they can contact or separate each other. The flange portion 25b is sandwiched slidably between the thrust members 22 and 23 on axial surfaces in the hysteresis unit 4 which locates internal circumference of the damper unit 3.

According to example 1, by supporting the side plate 17 and the hub member 25 rotatably using the guide portion 5a formed on a small radius area of the flywheel 5, a radius of a bearing portion can be structured in small radius and an eccentric load to the bearing of the rotating shaft 6 of engine side and the rotating shaft 7 of motor side can be reduced and suppressed, and then a torque radius of the limiter unit 2 is stabilized and a limit torque is stabilized. Additional pieces for the guide portion 5a are unnecessary and a fabrication cost of the apparatus can be reduced. Since the guide portion 5a is formed in a small size, a high accuracy of the size is achieved and the bearing portion can be made small and low cost. Since the guide portion 5a is made in a small radius, an influence about a centrifugal force and a difference of rotation from that of a facing part can be reduced. Since a part of the guide portion 5a which supports the side plate 17 and the hub member 25 is apart from the main body of the flywheel 5, influence of heat causes no problem. In addition, since the grease is kept out of the hysteresis unit 4 with the aid of the tapered portion 5b and the penetration hole portion 5c, the hysteresis function is stabilized and a noise vibration characteristic is stabilized.

EXAMPLE 2

Figure 3:
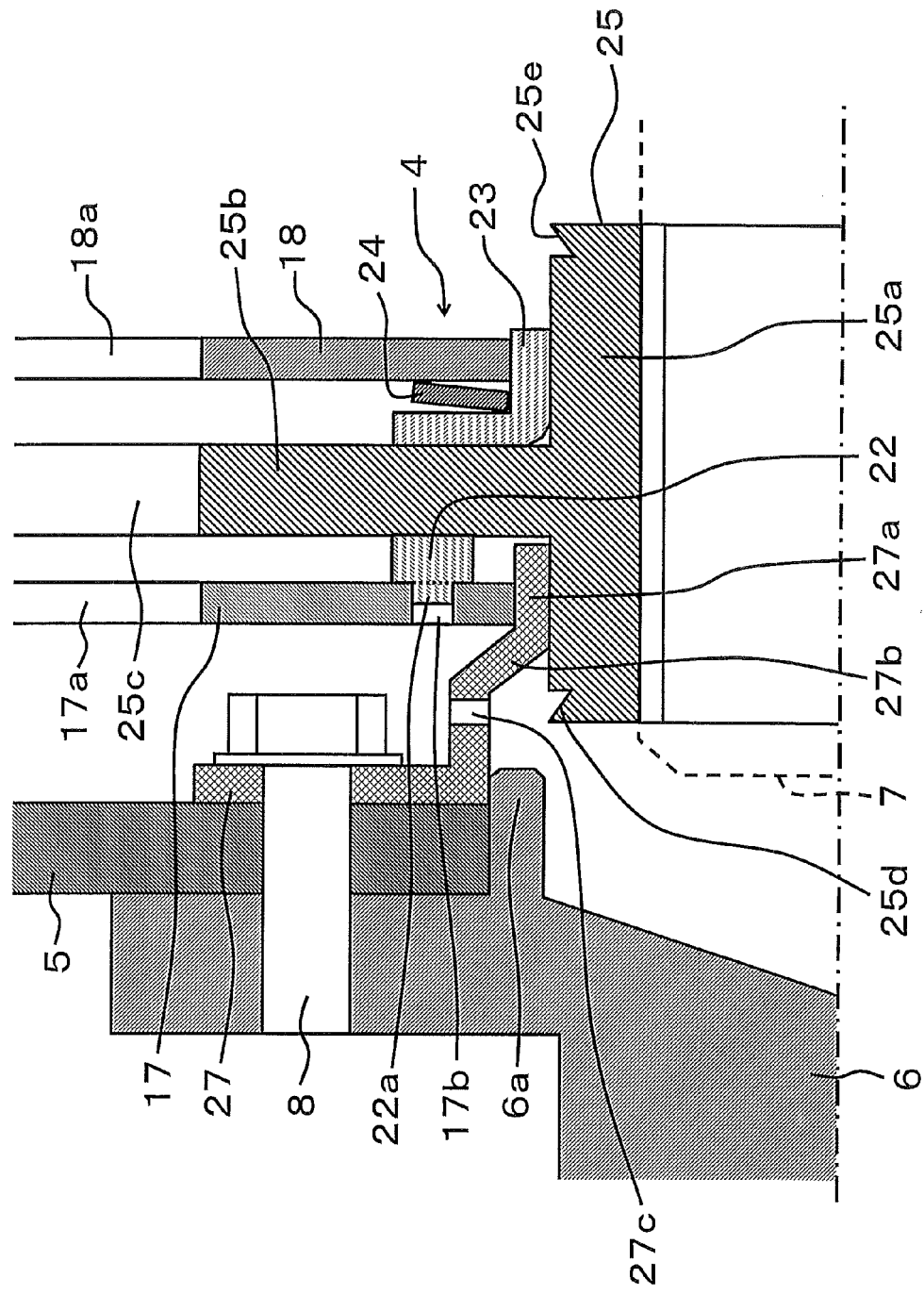
FIG. 3 shows an enlarged partial sectional view for illustrating a structure around a center axis of a shaft of a torque fluctuation absorber according to example 2.

A torque fluctuation absorber according to example 2 of the present disclosure will be explained with reference to a drawing. FIG. 3 shows an enlarged partial sectional view for illustrating a structure around a center (axis) of a shaft of a torque fluctuation absorber according to example 2 of the present disclosure.

According to example 2, a guide member 27 which is a different piece from the flywheel 5 is provided instead of the guide portion (designated as 5a in FIG. 2) of the flywheel (5 in FIG. 2) of example 1. Other structure is the same as example 1.

The guide member 27 is an annular member arranged on an outer circumference of an extending portion 6a of the rotating shaft 6 of engine side such that an axis of the guide member 27 is aligned to be coaxial with the rotating shaft 6 of engine side. The guide member 27 is held on the rotating shaft 6 of engine side by a bolt 8 with the flywheel 5. The guide member 27 can be held by press fitting or caulking to the extending portion 6a of the rotating shaft 6 of engine side or by welding to the extending portion 6a or the flywheel 5 instead of the bolt 8. The guide member 27 has a cylindrical guide portion 27a extending from radially internal side of the bolt 8 (small radius portion) toward the hub member 25. A portion around the end of the guide portion 27a is arranged between an internal circumferential end surface of the side plate 17 and an outer circumferential surface of a hub portion 25a of the hub member 25. The guide portion 27a is in contact with the side plate 17 and the hub portion 25a such that the guide portion 27a supports the side plate 17 and the hub member 25 rotatably and suppresses eccentricity of the side plate 17 and the hub member 25. The guide portion 27a has a tapered portion 27b (or stepped portion is also possible), at its middle portion, that inclines so as to be apart from the side plate 17 (that is, gradually increased in radius) as it goes toward outer circumference. The tapered portion 27b has a function to turn away grease, which is applied at a spline engaging portion of the hub portion 25a and the rotating shaft 7 of motor side, from a hysteresis unit 4 when the grease is dispersed by a centrifugal force. The guide portion 27a has at least one penetration hole portion 27c at a large radius portion in the vicinity of the end portion. The penetration hole portion 27c is a hole to discharge the grease guided to internal circumference by the tapered portion 27b to the outer circumferential side. The penetration hole portion 27c may be formed at the tapered portion 27b. A hysteresis function is stabilized and then noise vibration characteristics is stabilized by keeping the grease away from the hysteresis unit 4 by the tapered portion 27b and the penetration hole portion 27c. Preferably, an elastic body such as a metal, resin, carbon fiber, etc. is used for the guide member 27 so as to permit a micro displacement at the guide portion 27a. The guide member 27 may has a slit or a cavity to control an amount of the displacement at the guide portion 27a.

According to example 2, as example 1, a radius size of a bearing portion can be reduced, eccentricity of the apparatus can be reduced or suppressed, size accuracy can be increased, volume of the bearing portion can be reduced, influence of heat causes no problem, hysteresis function can be stabilized and noise vibration characteristic can be stabilized. And additional shaft alignment for the guide member 27 is unnecessary because the guide member 27 is aligned and held on the rotating shaft 6 of engine side with the flywheel 5. The guide member 27 is cost effective than a bearing when using an elastic body. A modulus of elasticity of the guide member 27 is adjustable by adjusting a shape or number of the slit or cavity formed on the guide member 27. Since the guide member 27 permits a micro displacement with generating a resisting force, eccentricity can be reduced or suppressed and unbalanced force occurred at one of the bearings caused by three-point support of the rotating shaft 7 of motor side can be suppressed and thus a lifetime of the apparatus is not reduced. In addition, a cost increasing can be restrained because the guide member 27 is held on the rotating shaft 6 of engine side by the bolt 8 with the flywheel 5.

EXAMPLE 3

Figure 4:
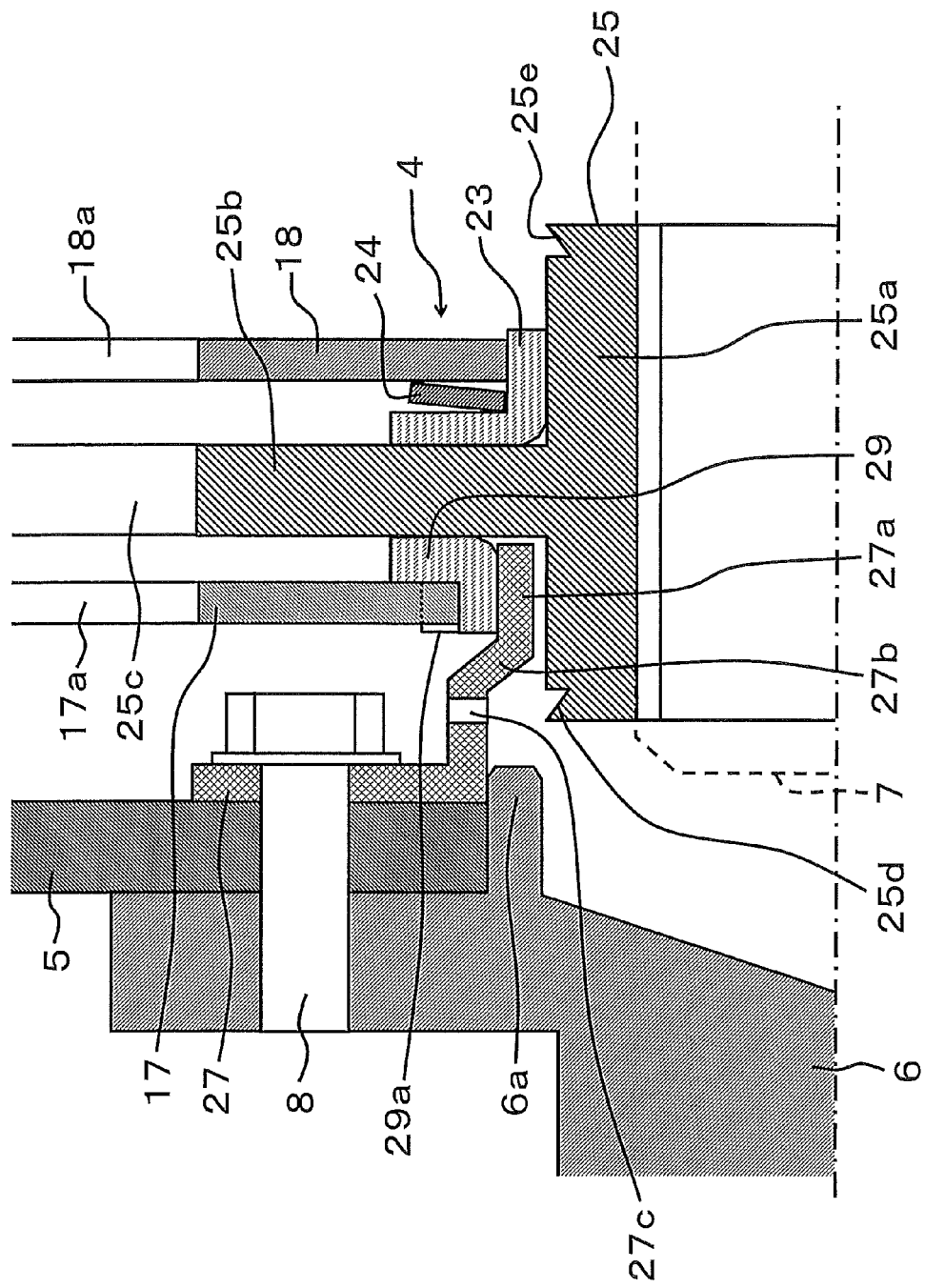
FIG. 4 shows an enlarged partial sectional view for illustrating a structure around a center axis of a shaft of a torque fluctuation absorber according to example 3.

A torque fluctuation absorber according to example 3 of the present disclosure will be explained with reference to a drawing. FIG. 4 shows an enlarged partial sectional view for illustrating a structure around a center of a shaft of a torque fluctuation absorber according to example 3 of the present disclosure.

Example 3 is a variation of example 2 (see FIG. 3) and an internal circumferential surface of the guide portion 27a of the guide member 27 is apart from an outer circumferential surface of the hub portion 25a of the hub member 25, and a thrust member 29 as a bush is located between an outer circumferential surface of the guide portion 27a and an internal circumferential end surface of the side plate 17. The guide portion 27a prevents eccentricity of the side plate 17 via the thrust member 29 and prevents eccentricity of the hub member 25 via the thrust member 29, side plates 17 and 18 (side plates 17 and 18 are connected by a rivet), and the thrust member 23. Other structure is the same as example 2.

The thrust member 29 is a structural member of the hysteresis unit 4 and an annular member sandwiched between the side plate 17 and the hub member 25. The thrust member 29 is axially arranged between the side plate 27 and the flange portion 25b and is in contact with the flange portion 25b slidably with pushing force. The thrust member 29 has a rotation-stop portion 29a which is inserted in a pit portion formed at an internal circumferential end portion of the side plate 17. The rotation-stop portion 29a has a role to prevent the thrust member 29 from rotating against the side plate 17.

According to example 3, it has the same meritorious effect as example 2.

EXAMPLE 4

A torque fluctuation absorber according to example 4 of the present disclosure will be explained with reference to a drawing. FIG. 5 shows an enlarged partial sectional view for illustrating a structure around a center of a shaft of a torque fluctuation absorber according to example 4 of the present disclosure.

Example 4 is a variation of example 3 (see FIG. 4) and an outer circumferential surface of the guide portion 27a of the guide member 27 is apart from an internal circumferential surface of the thrust member 29, and an internal circumferential surface of the guide portion 27a is rotatably in contact with an outer circumferential surface of the hub portion 25a of the hub member 25. The guide portion 27a prevents eccentricity of the hub portion 25a and also prevents eccentricity of the side plate 18 via the hub member 25, thrust member 23 and the side plate 17 (side plates 17 and 18 are connected by a rivet). Other structure is the same as example 3.

According to example 4, it has the same meritorious effect as example 3 (example 2).

EXAMPLE 5

Figure 6:
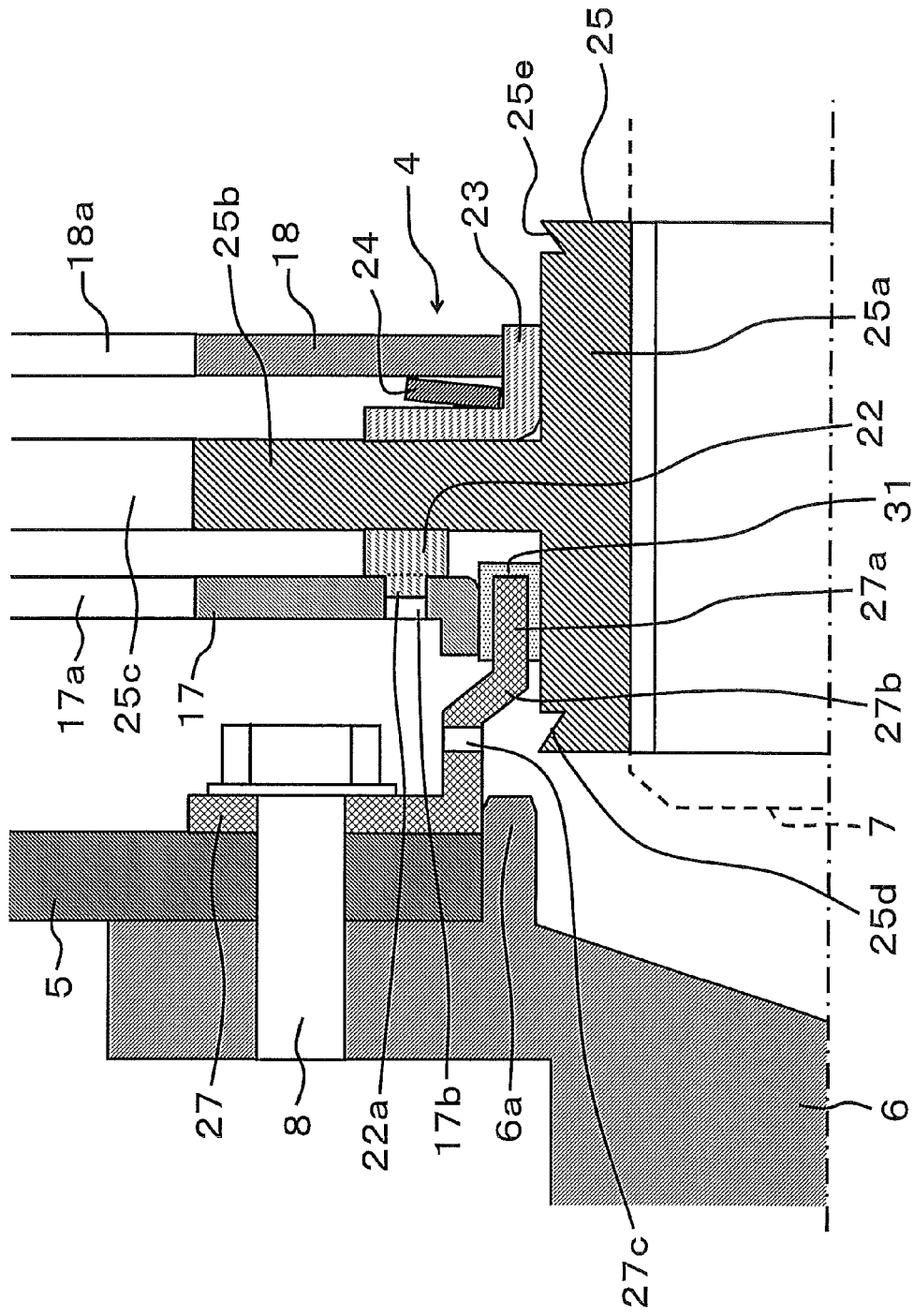
FIG. 6 shows an enlarged partial sectional view for illustrating a structure around a center axis of a shaft of a torque fluctuation absorber according to example 5.

A torque fluctuation absorber according to example 5 of the present disclosure will be explained with reference to a drawing. FIG. 6 shows an enlarged partial sectional view for illustrating a structure around a center of a shaft of a torque fluctuation absorber according to example 5 of the present disclosure.

Example 5 is a variation of example 2 (see FIG. 3) and a bush 31 made of metal or resin which is different from a material of the guide member 27 is formed on both sides of the end portion of the guide portion 27a of the guide member 27. The bush 31 located between an outer circumferential surface of the guide portion 27a and an internal circumferential end surface of the side plate 17 and between an internal circumferential surface of the guide portion 27a and an outer circumferential surface of the hub portion 25a of the hub member 25. The bush 31 is in contact with the side plate 17 and the hub portion 25a relatively rotatably. Other structure is the same as example 2.

According to example 5, cost increase is curbed by providing the bush 31 at a sliding portion of the guide portion 27a as well as obtaining the same effect as example 2.

EXAMPLE 6

Figure 7:
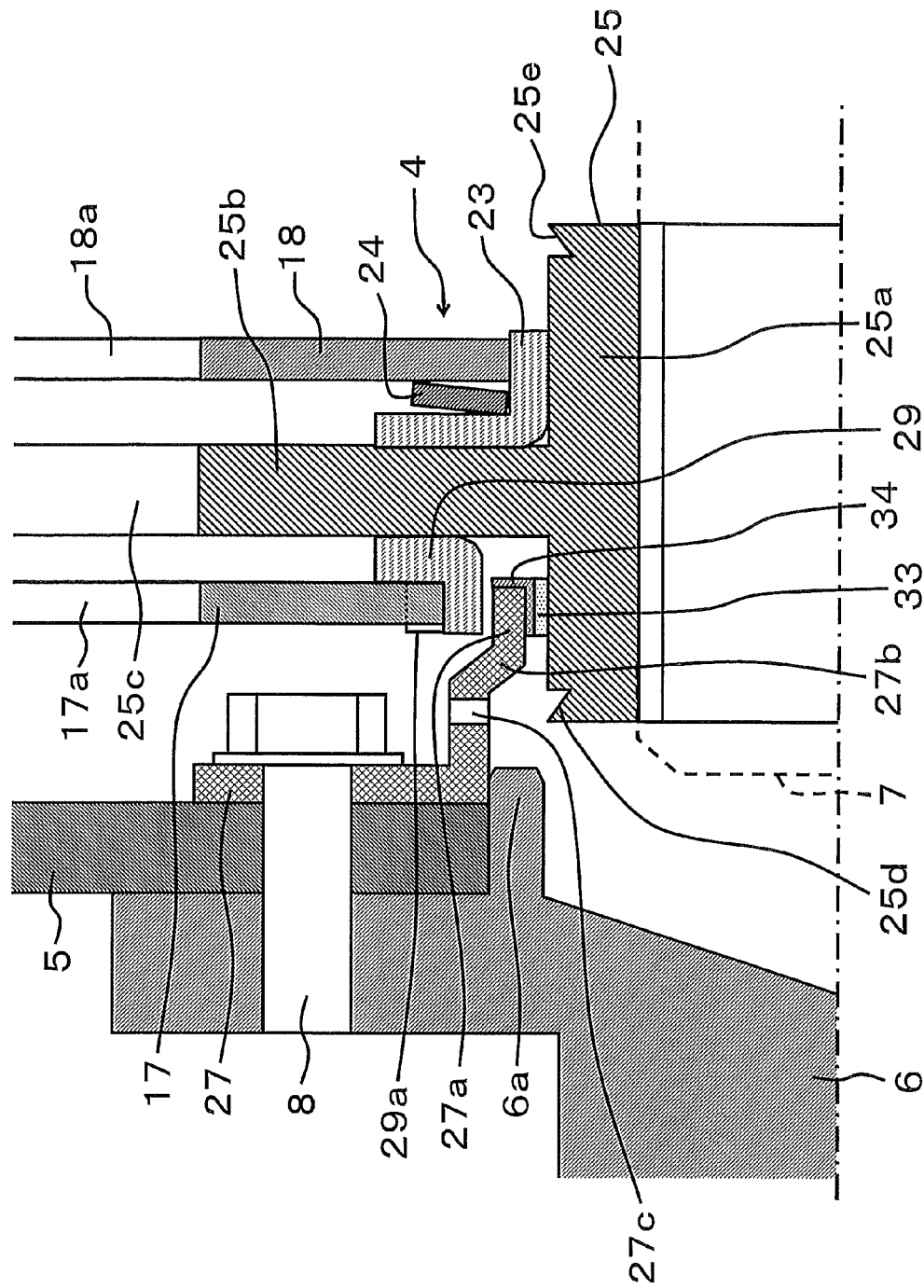
FIG. 7 shows an enlarged partial sectional view for illustrating a structure around a center of a shaft of a torque fluctuation absorber according to example 6.

A torque fluctuation absorber according to example 6 of the present disclosure will be explained with reference to a drawing. FIG. 7 shows an enlarged partial sectional view for illustrating a structure around a center (axis) of a shaft of a torque fluctuation absorber according to example 6 of the present disclosure.

Example 6 is a variation of example 4 (see FIG. 5) and a bush made of metal or resin is configured at an internal circumferential surface around the end portion of the guide portion 27a of the guide member 27 via an elastic body 34 made of rubber and the like (which is lower in modulus of elasticity than the guide portion 27a). The bush 33 is in contact with the hub portion 25a relatively rotatably. The guide portion 27a is apart from an internal circumferential surface of the thrust member 29. The elastic body 34 is adhered to the guide portion 27a and the bush 33. Other structure is the same as example 4.

According to example 6, it has the same effect as example 4 (example 2), and in addition, the hub member 25 is elastically supported by the elastic body 34 intervening between the guide portion 27a and the bush 33, and thus eccentricity of the hub member 25 can be reduced or suppressed and unbalanced force occurred at one of the bearings caused by three-point support of the rotating shaft 7 of motor side can be suppressed, and therefore a lifetime of the apparatus is not reduced.

EXAMPLE 7

Figure 8:
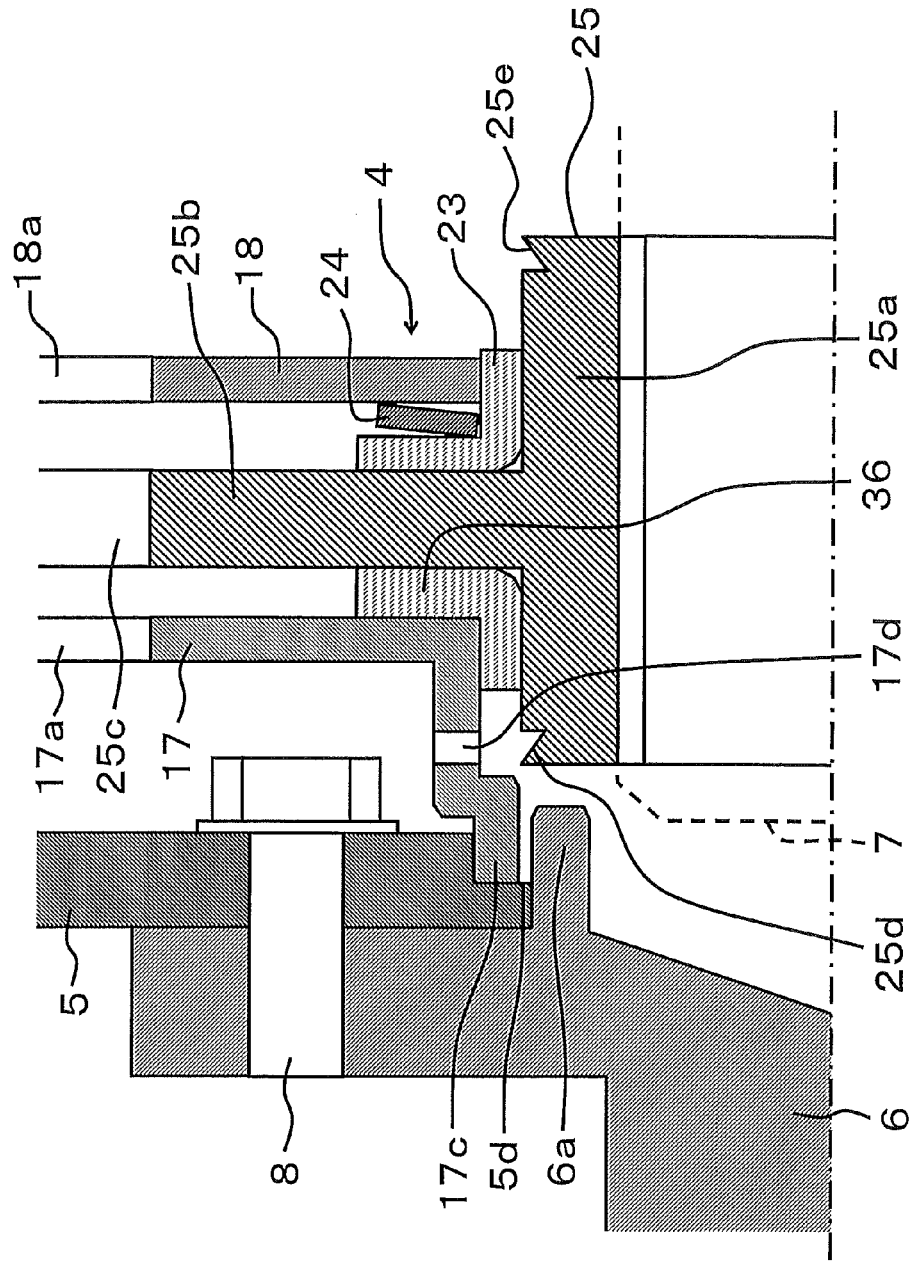
FIG. 8 shows an enlarged partial sectional view for illustrating a structure around a center of a shaft of a torque fluctuation absorber according to example 7.

A torque fluctuation absorber according to example 7 of the present disclosure will be explained with reference to a drawing. FIG. 8 shows an enlarged partial sectional view for illustrating a structure around a center of a shaft of a torque fluctuation absorber according to example 7 of the present disclosure.

According to example 7, a guide portion 17c is provided on the side plate 17 instead of the guide portion (designated as 5a in FIG. 2) of the flywheel (5 in FIG. 2) of example 1. The end portion of the guide portion 17c is inserted in a stepped pit portion 5d formed at radially internal side of the bolt 8 of the flywheel 5 (or radially internal side of an extending portion 6a of the rotating shaft 6 of engine side may be also possible), and is in contact with a wall surface in radial direction of the stepped pit portion 5d and supported by the flywheel 5 rotatably, and as a result eccentricity of the side plate 17 is prevented. The guide portion 17c has at least one penetration hole portion 17d. The penetration hole portion 17d is a hole to discharge grease collected at radially internal side of the guide portion 17c to outer circumferential side when the grease applied to a spline engaging portion of the hub portion 25a and the rotating shaft 7 of motor side was dispersed by the centrifugal force. A thrust member 36 located in axial and radial space between the side plate 17 and the hub member 25. Other structure is the same as example 1.

According to example 7, as example 1, a radius size of a bearing portion can be reduced, eccentricity of the apparatus can be reduced or suppressed, size accuracy can be increased, volume of the bearing portion can be reduced, influence of heat causes no problem, hysteresis function can be stabilized and noise vibration characteristic can be stabilized.

EXAMPLE 8

Figure 9:
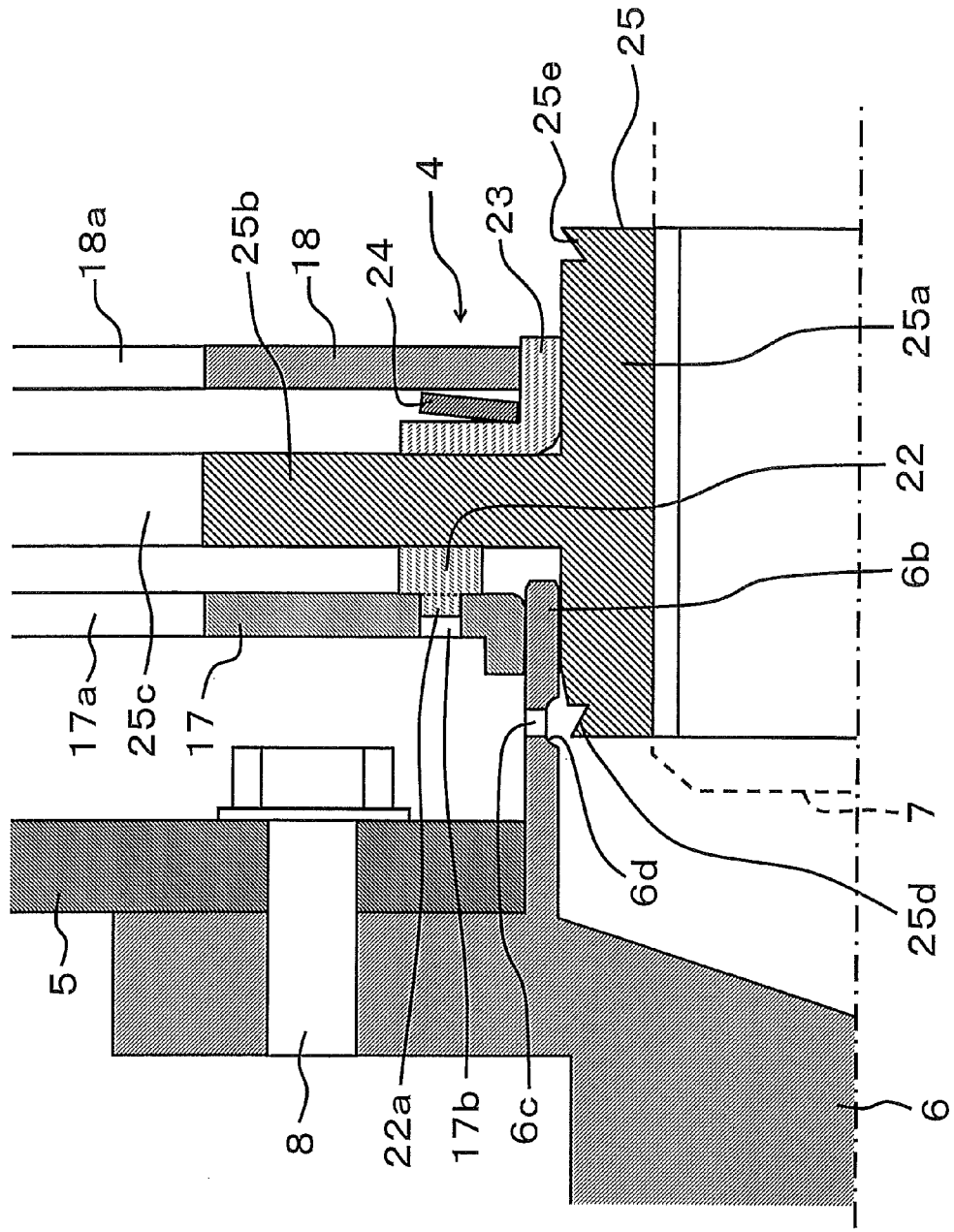
FIG. 9 shows an enlarged partial sectional view for illustrating a structure around a center of a shaft of a torque fluctuation absorber according to example 8.

A torque fluctuation absorber according to example 8 of the present disclosure will be explained with reference to a drawing. FIG. 9 shows an enlarged partial sectional view for illustrating a structure around a center of a shaft of a torque fluctuation absorber according to example 8 of the present disclosure.

According to example 8, a guide portion 6b is provided on the rotating shaft 6 of engine side instead of the guide portion (designated as 5a in FIG. 2) of the flywheel (5 in FIG. 2) of example 1. The rotating shaft 6 of engine side has the guide portion 6b extending from more internal circumferential position (small radius position) than the bolt 8 toward the hub member 25. Around the end portion of the guide portion 6b is arranged between an internal circumferential end surface of the side plate 17 and an outer circumferential surface of the hub portion 25a of the hub member 25 and is in contact with the side plate 17 and the hub portion 25a, supporting the side plate 17 and the hub member 25 rotatably so as to prevent eccentricity of the side plate 17 and the hub member 25. The guide portion 6b has a groove portion 6d circumferentially formed on an internal circumferential surface of a middle portion. The guide portion 6b has at least one penetration hole portion 6c on the area where the groove portion 6d is formed. The penetration hole portion 6c is a hole to discharge grease dispersed and collected at the groove portion 6d by the centrifugal force toward outer circumferential side. Since the grease is kept out of the hysteresis unit 4 with the aid of the penetration hole portion 6c, the hysteresis function is stabilized and a noise vibration characteristic is stabilized. Other structure is the same as example 1.

According to example 8, as example 1, a radius size of a bearing portion can be reduced, eccentricity of the apparatus can be reduced or suppressed, size accuracy can be increased, volume of the bearing portion can be reduced, influence of heat causes no problem, hysteresis function can be stabilized and noise vibration characteristic can be stabilized.

EXAMPLE 9

Figure 10:
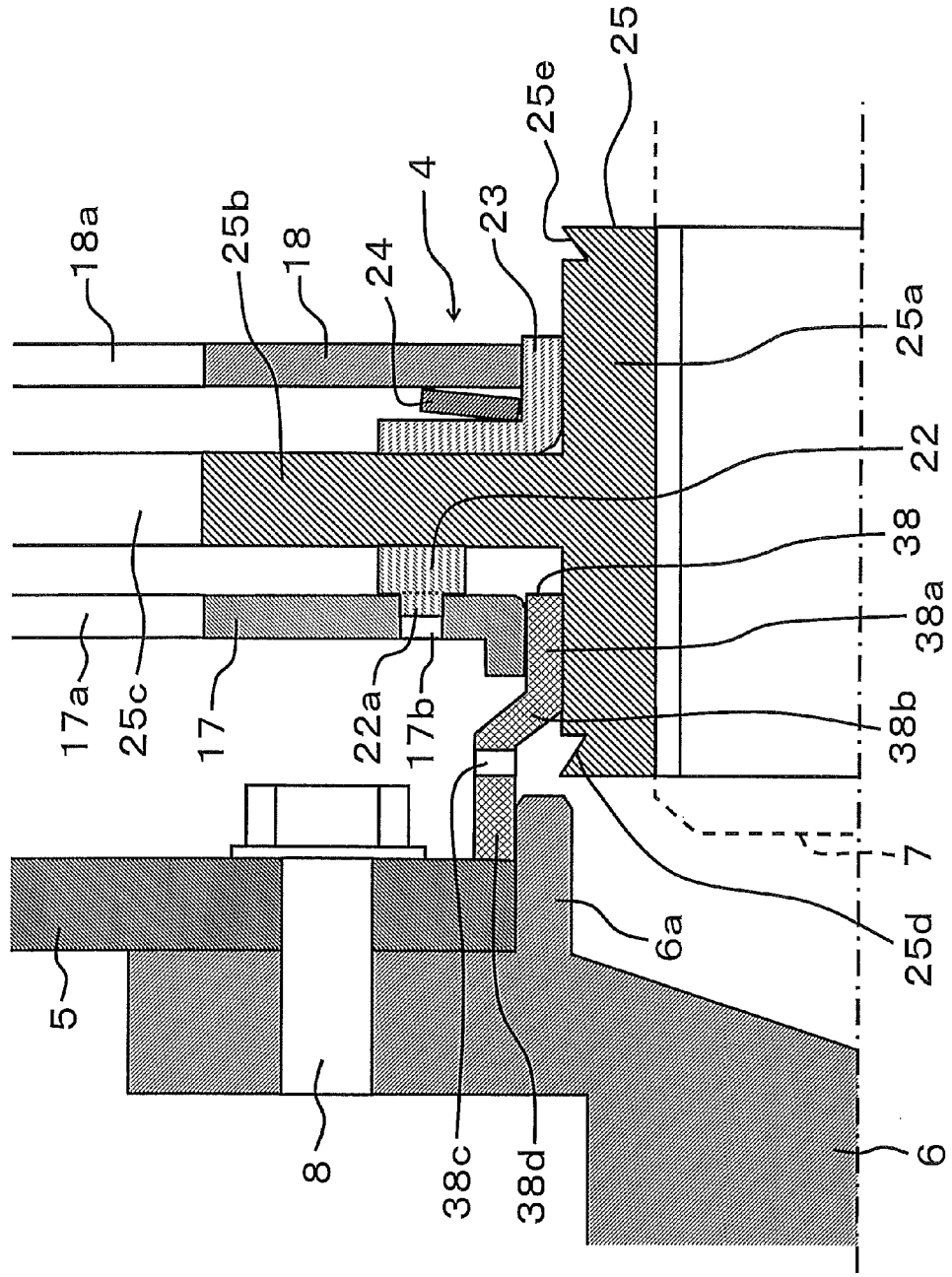
FIG. 10 shows an enlarged partial sectional view for illustrating a structure around a center of a shaft of a torque fluctuation absorber according to example 9.

A torque fluctuation absorber according to example 9 of the present disclosure will be explained with reference to a drawing. FIG. 10 shows an enlarged partial sectional view for illustrating a structure around a center of a shaft of a torque fluctuation absorber according to example 9 of the present disclosure.

According to example 9, a guide member 38 is provided instead of the guide portion (designated as 6b in FIG. 9) of the rotating shaft of engine side (6 in FIG. 9) of example 8. Other structure is the same as example 8.

The guide member 38 is a cylindrical member provided on an extending portion 6a (small radius portion) of the rotating shaft 6 of engine side located at radially internal side of the bolt 8. The guide member 38 has a cylindrical guide portion 38a at the side of the hub member 25. The guide portion 38a is arranged between an internal circumferential end surface of the side plate 17 and an outer circumferential surface of the hub portion 25a of the hub member 25 and is in contact with the side plate 17 and the hub portion 25a, supporting the side plate 17 and the hub member 25 rotatably so as to prevent eccentricity of the side plate 17 and the hub member 25. The guide member 38 has a tapered portion 38b (or stepped portion is also possible), at its middle portion, that inclines so as to be apart from the side plate 17 (that is, gradually increased in radius) as it goes toward outer circumference. The tapered portion 38b has a function to turn away grease, which is applied at a spline-engaging portion of the hub portion 25a and the rotating shaft 7 of motor side, from a hysteresis unit 4 when the grease is dispersed by a centrifugal force. The guide portion 38a has at least one penetration hole portion 38c at a large radius portion on a flywheel 5 side. The penetration hole portion 38c is a hole to discharge the grease guided to internal circumference by the tapered portion 38b to the outer circumferential side. The penetration hole portion 38c may be formed at the tapered portion 38b. A hysteresis function is stabilized and then noise vibration characteristics is stabilized by keeping the grease away from the hysteresis unit 4 by the tapered portion 38b and the penetration hole portion 38c. The guide member 38 has a mounting portion 38d for mounting itself to the extending portion 6a of the rotating shaft 6 of engine side on a flywheel 5 side from the penetration hole portion 38c. The mounting portion 38d is mounted on an outer circumferential side of the extending portion 6a. Preferably an elastic body such as a metal, resin, carbon fiber and the like is used for the guide member 38 so as to permit a micro displacement at the guide portion 38a. A slit or cavity may be formed on the guide member 38 to adjust an amount of the displacement at the guide portion 38a.

According to example 9, as example 8, a radius size of a bearing portion can be reduced, eccentricity of the apparatus can be reduced or suppressed, size accuracy can be increased, volume of the bearing portion can be reduced, influence of heat causes no problem, hysteresis function can be stabilized and noise vibration characteristic can be stabilized. And additional shaft alignment for the guide member 38 is unnecessary because the guide member 38 is mounted on the extending portion 6a of the aligned rotating shaft 6 of engine side. The guide member 38 is cost effective than a bearing when using an elastic body. A modulus of elasticity of the guide member 38 is adjustable by adjusting a shape or number of the slit or cavity formed on the guide member 38. Since the guide member 38 permits a micro displacement with generating a resisting force, eccentricity can be reduced or suppressed and unbalanced force occurred at one of the bearings caused by three-point support of the rotating shaft 7 of motor side can be suppressed and thus a lifetime of the apparatus is not reduced. In addition, a cost increasing can be restrained because the guide member 38 is mounted on the extending portion 6a of the rotating shaft 6 of engine side.

EXAMPLE 10

Figure 11:
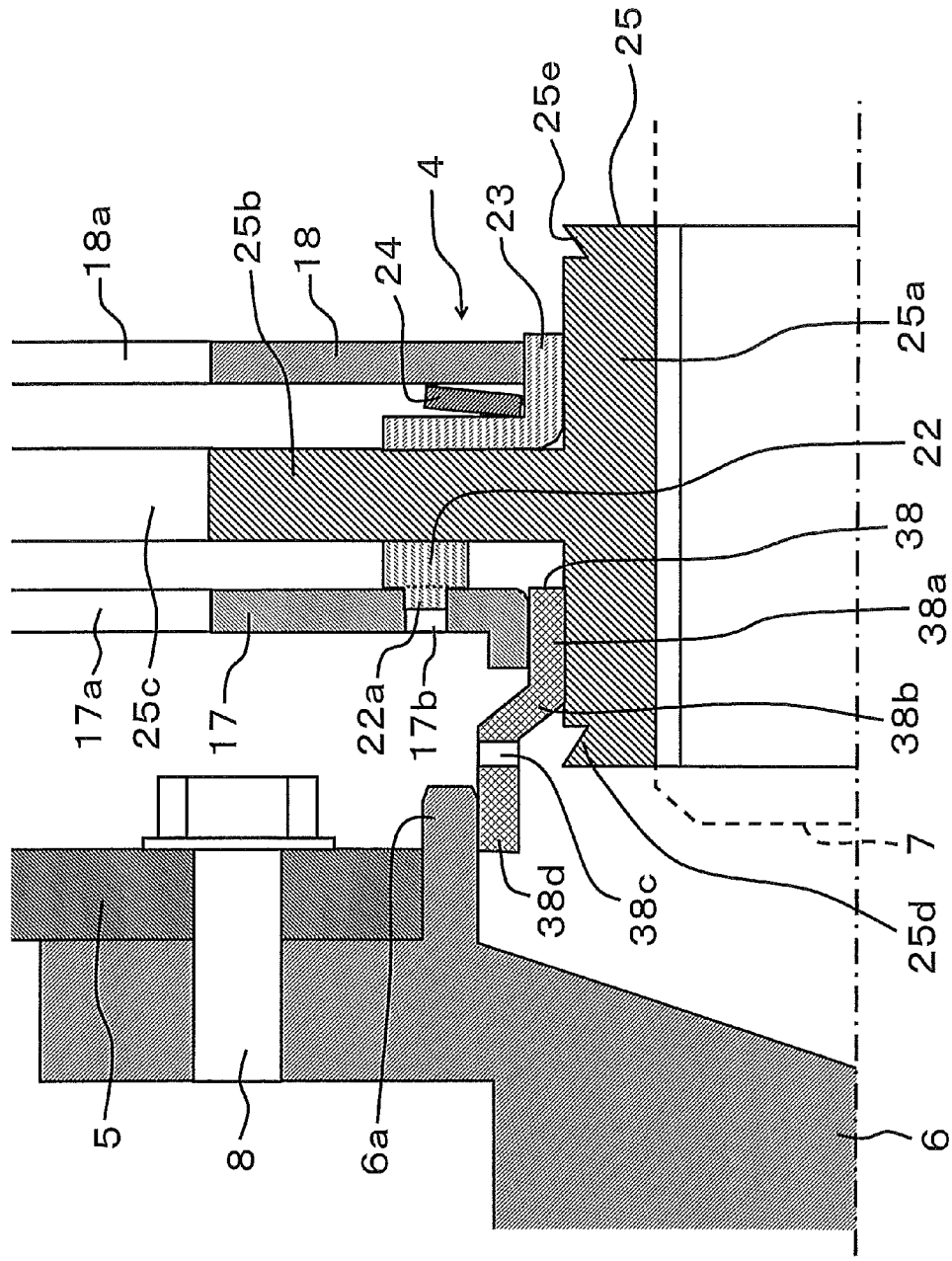
FIG. 11 shows an enlarged partial sectional view for illustrating a structure around a center of a shaft of a torque fluctuation absorber according to example 10.

A torque fluctuation absorber according to example 10 of the present disclosure will be explained with reference to a drawing. FIG. 11 shows an enlarged partial sectional view for illustrating a structure around a center of a shaft of a torque fluctuation absorber according to example 10 of the present disclosure.

According to example 10, the mounting portion 38*d* of a guide member 38 which is similar to that of example 9 (see FIG. 10) is mounted on radially internal side of the extending portion 6*a* of the rotating shaft 6 of engine side. Other structure is the same as example 9.

According to example 10, it has the same effect as that of example 9.

EXAMPLE 11

Figure 12:
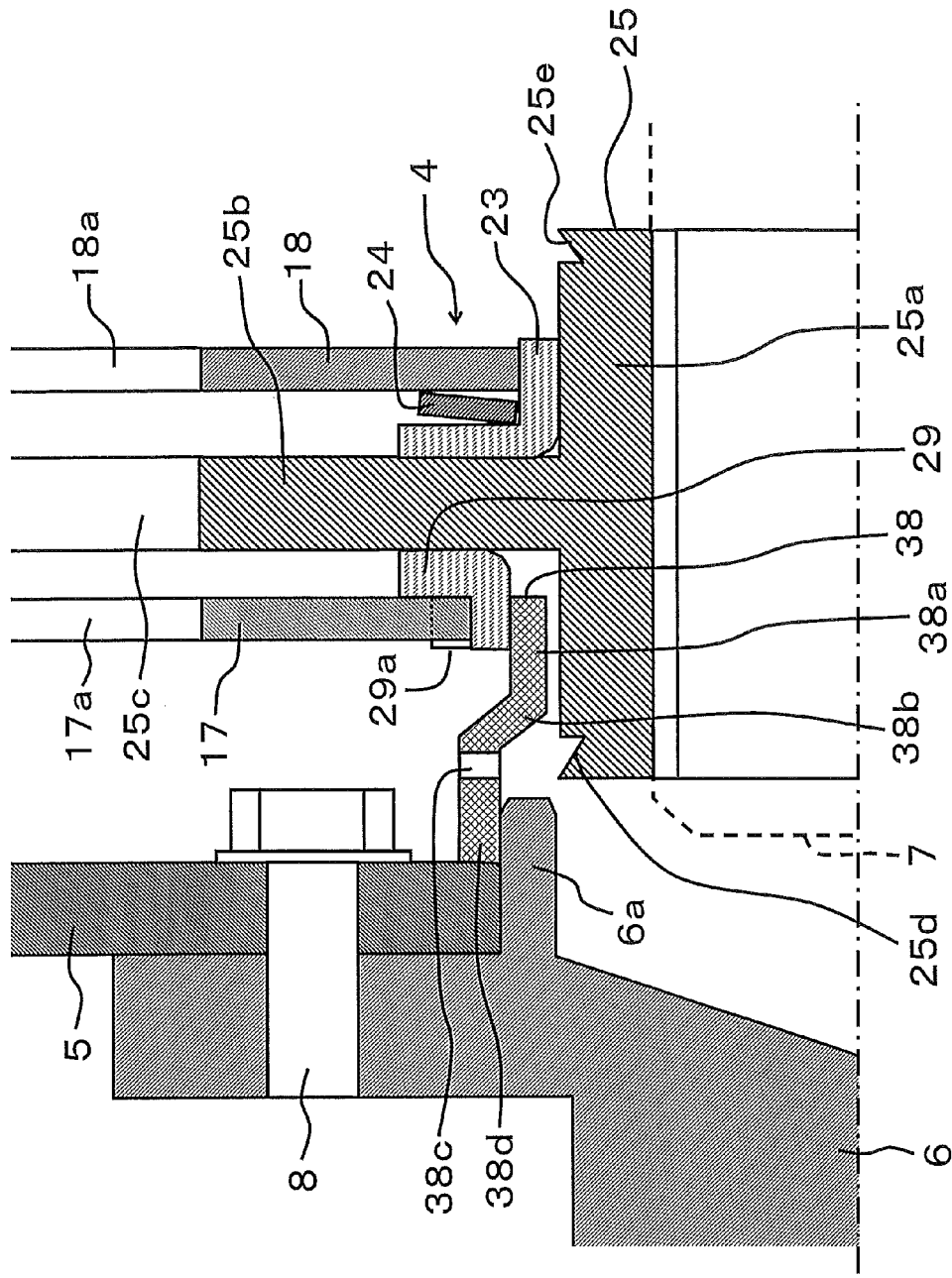
FIG. 12 shows an enlarged partial sectional view for illustrating a structure around a center of a shaft of a torque fluctuation absorber according to example 11.

A torque fluctuation absorber according to example 11 of the present disclosure will be explained with reference to a drawing. FIG. 12 shows an enlarged partial sectional view for illustrating a structure around a center (axis) of a shaft of a torque fluctuation absorber according to example 11 of the present disclosure.

Example 11 is a variation of example 9 (see FIG. 10) and an internal circumferential surface of the guide portion 38*a* of the guide member 38 is apart from an outer circumferential surface of the hub portion 25*a* of the hub member 25, and a thrust member 29 as a bush is located between an outer circumferential surface of the guide portion 38*a* and an internal circumferential end surface of the side plate 17. The guide portion 38 prevents eccentricity of the side plate 17 via the thrust member 29 and also prevents eccentricity of the hub member 25 via the thrust member 29, side plates 17 and 18 (the side plates 17 and 18 are connected by a rivet) and the thrust member 23. Other structure is the same as example 9.

The thrust member 29 is a structural member of the hysteresis unit 4 and an annular member arranged between the side plate 17 and the hub member 25. The thrust member 29 is axially arranged between the side plate 17 and the flange portion 25*b* and is in contact with the flange portion 25*b* slidably with pushing force. The thrust member 29 has a rotation-stop portion 29*a* which is inserted in a pit portion formed at an internal circumferential end portion of the side plate 17. The rotation-stop portion 29*a* has a role to prevent the thrust member 29 from rotating against the side plate 17.

According to example 11, it has the same effect as example 9.

EXAMPLE 12

Figure 13:
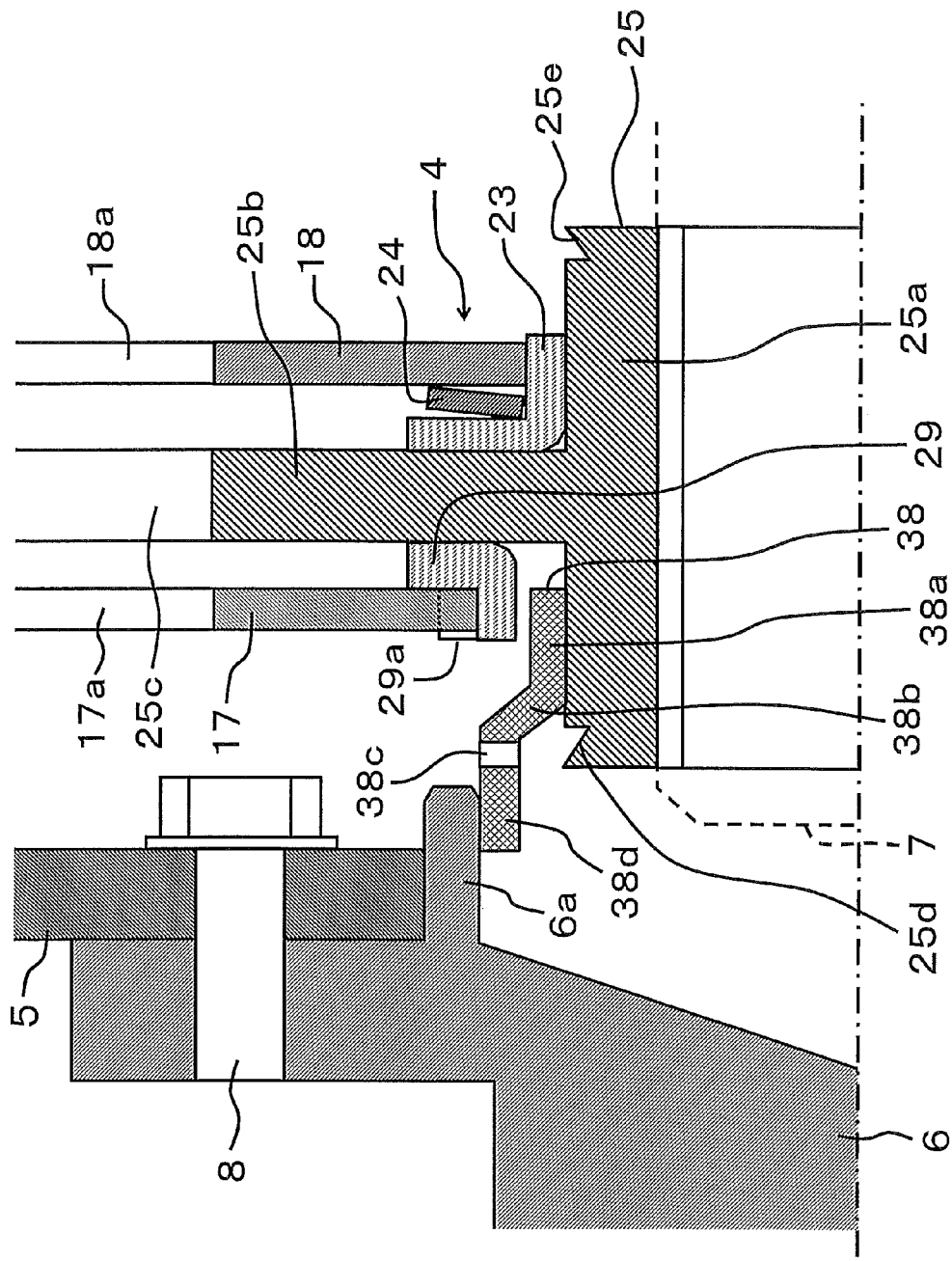
FIG. 13 shows an enlarged partial sectional view for illustrating a structure around a center of a shaft of a torque fluctuation absorber according to example 12.

A torque fluctuation absorber according to example 12 of the present disclosure will be explained with reference to a drawing. FIG. 13 shows an enlarged partial sectional view for illustrating a structure around a center of a shaft of a torque fluctuation absorber according to example 12 of the present disclosure.

Example 12 is a variation of example 11 (see FIG. 12) and the mounting portion 38*d* of the guide member 38 is mounted on radially internal side of the extending portion 6*a* of the rotating shaft 6 of engine side, an outer circumferential surface of the guide portion 38*a* of the guide member 38 is apart from an internal circumferential surface of the thrust member 29, and an internal circumferential surface of the guide portion 38*a* is in contact with an outer circumferential surface of the hub portion 25*a* of the hub member 25 rotatably. The guide portion 38*a* prevents eccentricity of the hub member 25 and also prevents eccentricity of the side plate 18 via the hub member 25, thrust member 23 and the side plate 17 (side plates 17 and 18 are connected by a rivet). Other structure is the same as example 11.

According to example 12, it has the same effect as example 11 (example 9).

EXAMPLE 13

Figure 14:
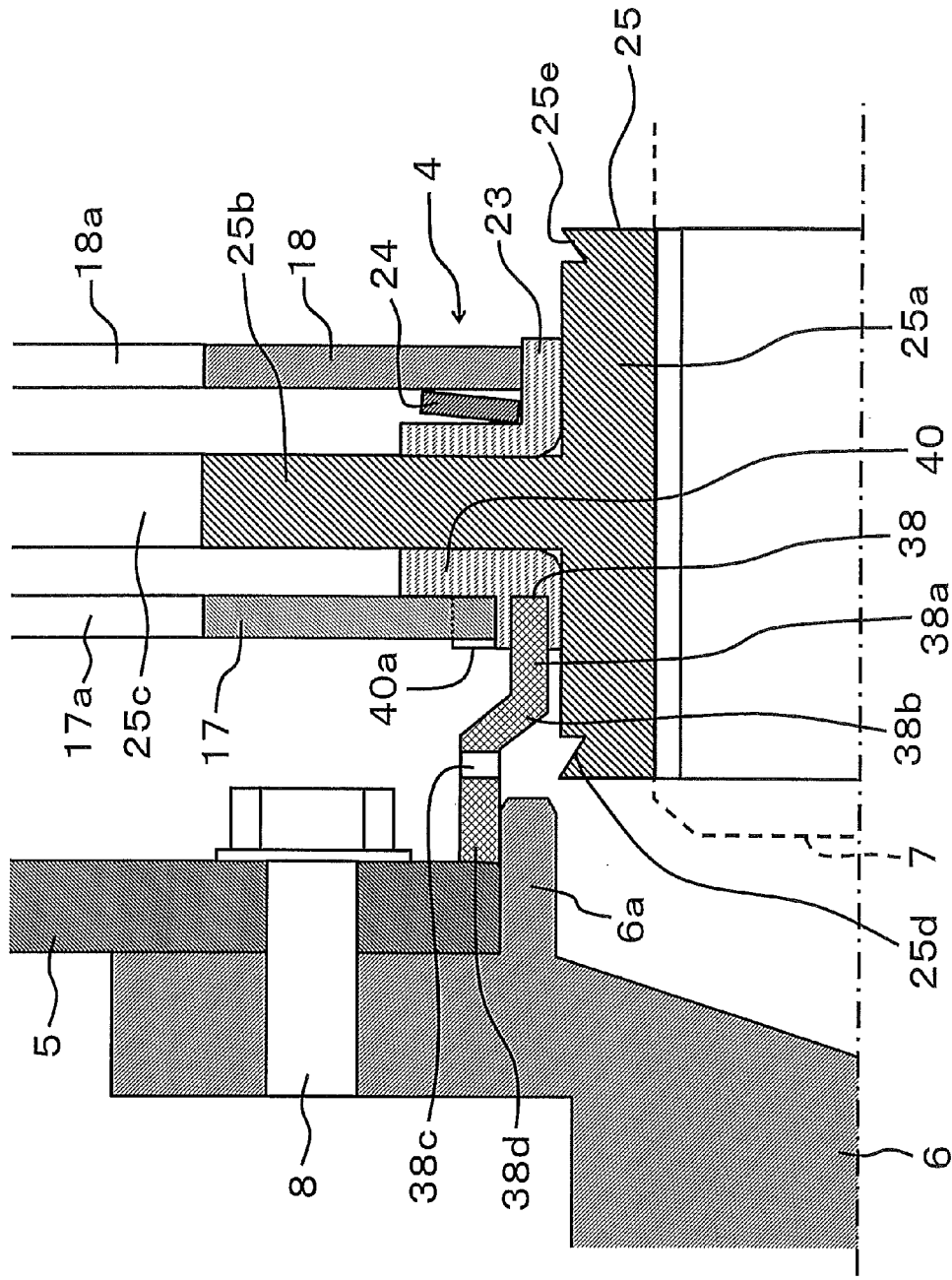
FIG. 14 shows an enlarged partial sectional view for illustrating a structure around a center of a shaft of a torque fluctuation absorber according to example 13.

A torque fluctuation absorber according to example 13 of the present disclosure will be explained with reference to a drawing. FIG. 14 shows an enlarged partial sectional view for illustrating a structure around a center of a shaft of a torque fluctuation absorber according to example 13 of the present disclosure.

Example 13 is a variation of example 11 (see FIG. 12) and a thrust member 40 is provided on both sides around the end portion of the guide portion 38*a* of the guide member 38. That is, a portion of the thrust member 40 located between an outer circumferential surface of the guide portion 38*a* and an internal circumferential end surface of the side plate 17 and another portion of the thrust member 40 located between an internal circumferential surface of the guide portion 38*a* and an outer circumferential surface of the hub portion 25*a* of the hub member 25. The thrust member 40 functions as a bush and is in contact with the hub portion 25*a* and the guide portion 38*a* relatively rotatably. Other structure is the same as example 2.

The thrust member 40 is a structural member of the hysteresis unit 4 and an annular member arranged between the side plate 17 and the hub member 25. The thrust member 40 is axially arranged between the side plate 17 and the flange portion 25*b* and is in contact with the flange portion 25*b* slidably with biasing force. The thrust member 40 has a rotation-stop portion 40*a* which is inserted in a pit portion formed at an internal circumferential end portion of the side plate 17. The rotation-stop portion 40*a* has a role to prevent the thrust member 40 from rotating against the side plate 17.

According to example 13, it has the same effect as example 11 (example 9).

EXAMPLE 14

Figure 15:
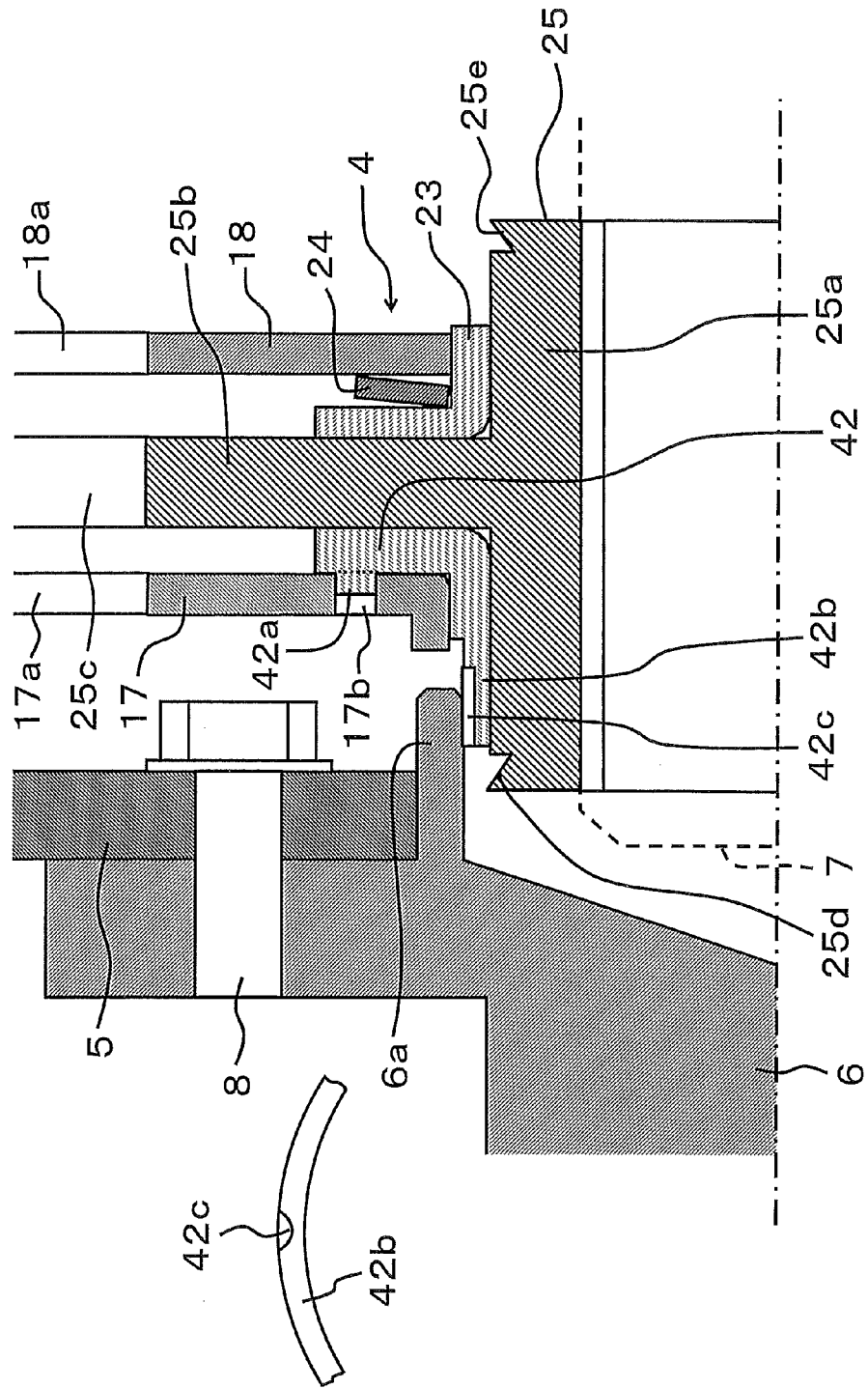
FIG. 15 shows an enlarged partial sectional view for illustrating a structure around a center of a shaft of a torque fluctuation absorber according to example 14.

A torque fluctuation absorber according to example 14 of the present disclosure will be explained with reference to a drawing. FIG. 15 shows an enlarged partial sectional view for illustrating a structure around a center of a shaft of a torque fluctuation absorber according to example 14 of the present disclosure.

According to example 14, a guide portion 42*b* is formed on a thrust member 42 instead of the guide portion (designated as 6*b* in FIG. 9) of the rotating shaft of engine side (6 in FIG. 9) in example 8. The thrust member 42 is a structural member of the hysteresis unit 4 and an annular member arranged between the side plate 17 and the hub member 25. The thrust member 42 is arranged between the side plate 17 and the flange portion 25*b* and is in contact with the flange portion 25*b* slidably with pushing (biasing) force. The thrust member 42 has a projecting portion 42*a* which is inserted in a pit portion 17*b* of the side plate 17. The projecting portion 42*a* has a role to prevent the thrust member 42 from rotating against the side plate 17. The thrust member 42 is also arranged between the side plate 17 and the hub portion 25*a* and is in contact with the hub portion 25*a* relatively rotatably. The thrust member 42 has a guide portion 42*b* extending toward a rotating shaft 6 of engine side from between the side plate 17 and the hub portion 25*a*. The guide portion 42*b* does not cover the groove portion 25*d* formed on the hub portion 25*a*. The end portion of the guide portion 42*b* is located between an internal circumferential surface of the extending portion 6*a* of the rotating shaft 6 of engine side and the hub portion 25a, and is in contact with the extending portion 6a relatively rotatably. The guide portion has at least one groove portion 42c on an outer circumferential surface thereof. The groove portion 42c has a role to discharge grease, which is dispersed by a centrifugal force and received at the extending portion 6a, to outer circumferential side. Other structure is the same as example 8.

According to example 14, as example 8, a radius size of a bearing portion can be reduced, eccentricity of the apparatus can be reduced or suppressed, size accuracy can be increased, volume of the bearing portion can be reduced and influence of heat causes no problem. A hysteresis function is stabilized and then noise vibration characteristics is stabilized by keeping the grease away from the hysteresis unit 4 by discharging the grease collected at an internal circumference of the extending portion 6a of the rotating shaft 6 of engine side through the groove portion 42c toward outer circumferential side. And an increase of a number of parts can be curbed by integrating the thrust member 42 and the guide portion 42b which are easy to form and then fabrication cost can be reduced.

EXAMPLE 15

Figure 16:
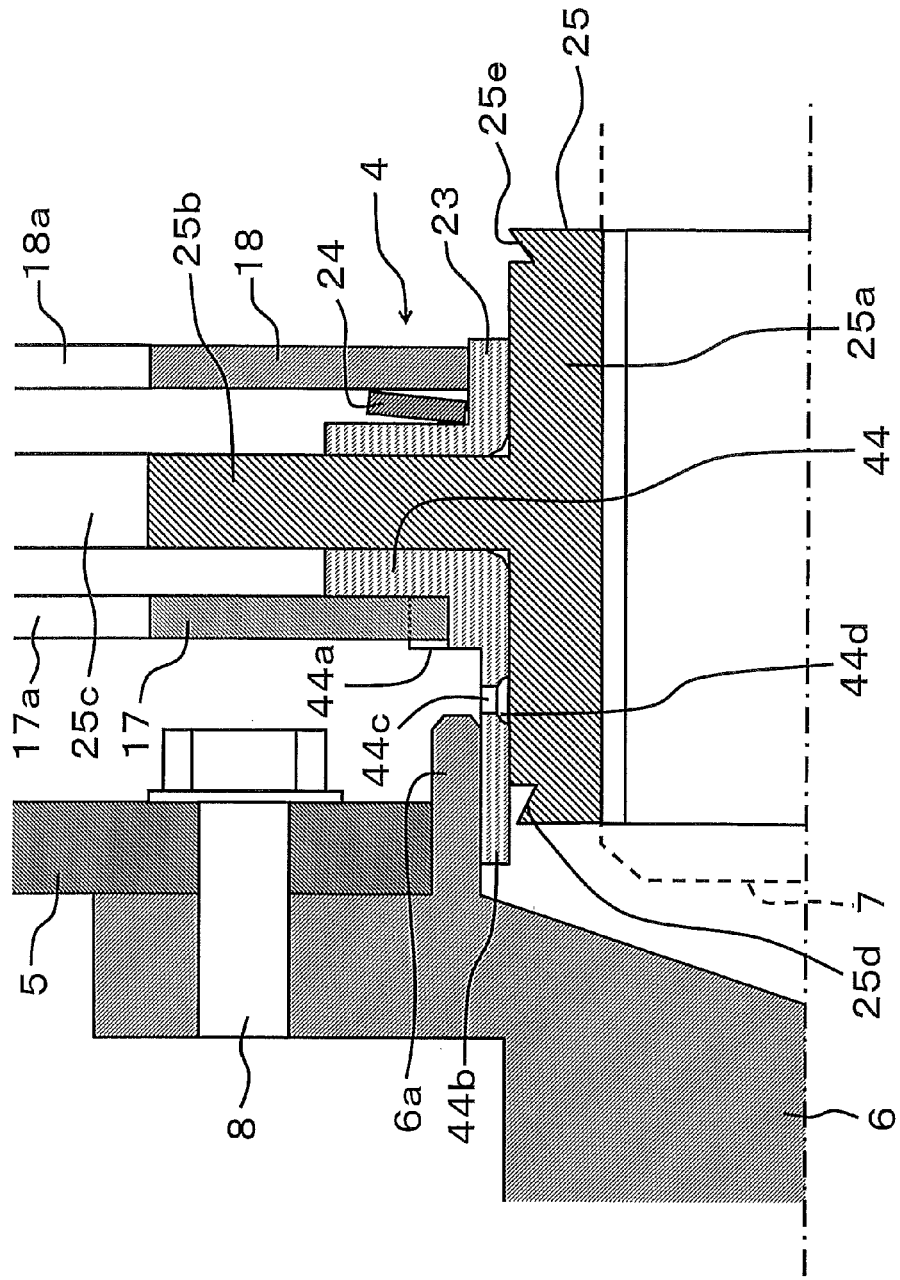
FIG. 16 shows an enlarged partial sectional view for illustrating a structure around a center axis of a shaft of a torque fluctuation absorber according to example 15.

A torque fluctuation absorber according to example 15 of the present disclosure will be explained with reference to a drawing. FIG. 16 shows an enlarged partial sectional view for illustrating a structure around a center of a shaft of a torque fluctuation absorber according to example 15 of the present disclosure.

Example 15 is a variation of example 14 (see FIG. 15) and a penetration hole portion 44c and a groove portion 44d for discharging grease are formed on a guide portion 44b of a thrust member 44. The thrust member 44 is a structural member of the hysteresis unit 4 and an annular member arranged between the side plate 17 and the hub member 25. The thrust member 44 is axially arranged between the side plate 17 and the flange portion 25b and is in contact with the flange portion 25b slidably with pushing force. The thrust member 44 has a rotation-stop portion 44a which is inserted in a pit portion formed at an internal circumferential end portion of the side plate 17. The rotation-stop portion 44a has a role to prevent the thrust member 44 from rotating against the side plate 17. The thrust member 44 is also arranged between the side plate 17 and the hub portion 25a and is in contact with the hub portion 25a relatively rotatably. The thrust member 44 has a guide portion 44b extending toward a rotating shaft 6 of engine side from between the side plate 17 and the hub portion 25a. The guide portion 44b covers the groove portion 25d formed on the hub portion 25a. The end portion of the guide portion 44b is located between an internal circumferential surface of the extending portion 6a of the rotating shaft 6 of engine side and the hub portion 25a, and extends over an end surface of the hub portion 25a on the side of the rotating shaft 6 of engine side toward a side of the rotating shaft 6 of engine side. The guide portion 44b is in contact with the extending portion 6a relatively rotatably. The guide portion 44b has the groove portion 44d formed in circumferential direction on an internal circumferential surface thereof in an area which is located on a flange portion 25b side from the groove portion 25d and is not covered by the extending portion 6a. The guide portion 44b has at least one penetration hole portion 44c in an area where the groove portion 44d is formed. The penetration hole portion 44c is a hole to discharge grease, which is dispersed by a centrifugal force and collected at the groove portion 44d by way of an interface of the hub portion 25a and the guide portion 44b, to an outer circumferential side. Since the grease is kept out of the hysteresis unit 4 with the aid of the penetration hole portion 44c and the groove portion 44d, the hysteresis function is stabilized and a noise vibration characteristic is stabilized. Other structure is the same as example 14.

According to example 15, as example 14, a radius size of a bearing portion can be reduced, eccentricity of the apparatus can be reduced or suppressed, size accuracy can be increased, volume of the bearing portion can be reduced and influence of heat causes no problem. And the hysteresis function is stabilized and a noise vibration characteristic is stabilized because the grease is kept out of the hysteresis unit 4 by discharging the grease dispersed by a centrifugal force and collected at the groove portion 44d by way of an interface of the hub portion 25a and the guide portion 44b to an outer circumferential side through the penetration hole portion 44c. And an increase of a number of parts can be curbed by integrating the thrust member 44 and the guide portion 44b which are easy to mold and then fabrication cost can be reduced.

EXAMPLE 16

Figure 17:
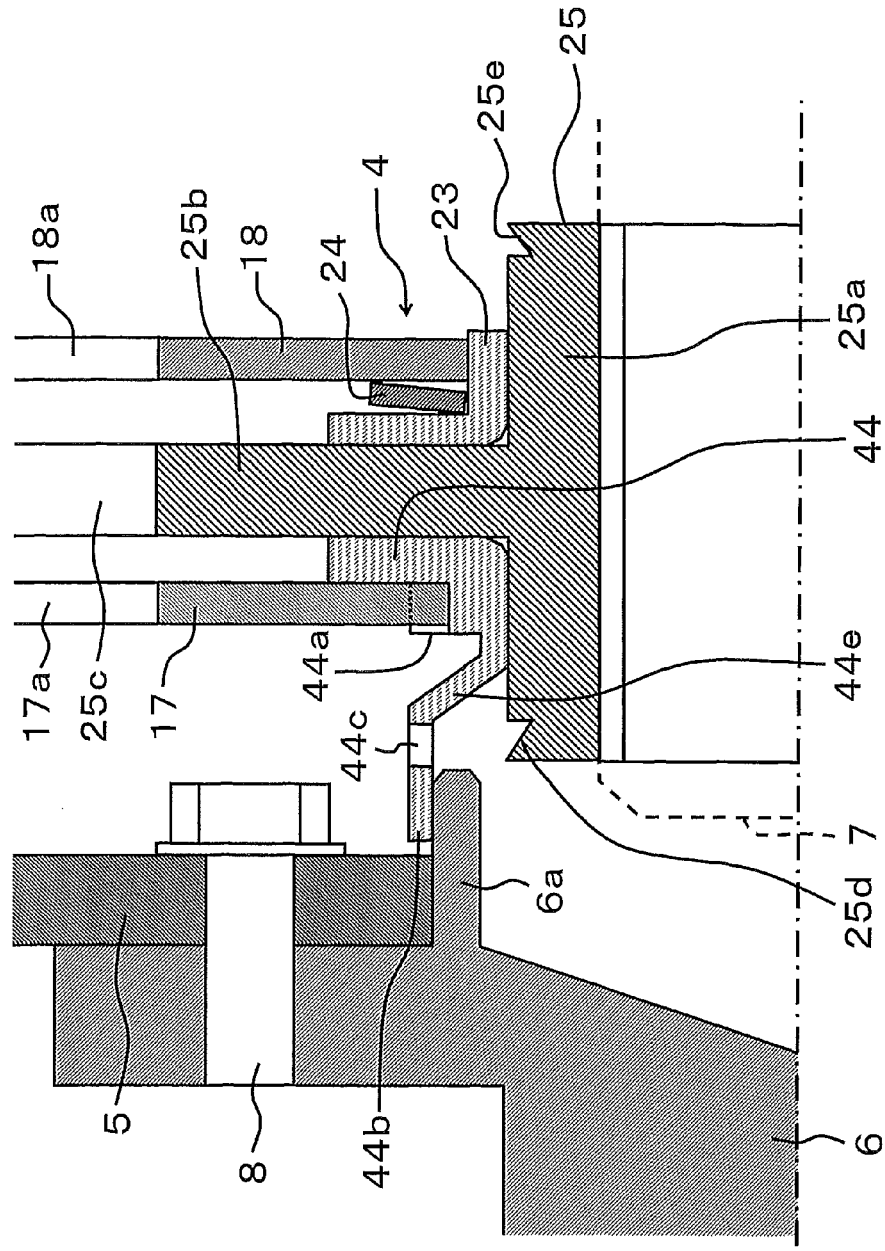
FIG. 17 shows an enlarged partial sectional view for illustrating a structure around a center axis of a shaft of a torque fluctuation absorber according to example 16.

A torque fluctuation absorber according to example 16 of the present disclosure will be explained with reference to a drawing. FIG. 17 shows an enlarged partial sectional view for illustrating a structure around a center of a shaft of a torque fluctuation absorber according to example 16 of the present disclosure.

Example 16 is a variation of example 15 (see FIG. 16) and the guide portion 44b of the thrust member 44 is in contact with an outer circumferential side of the extending portion 6a of the rotating shaft 6 of engine side rotatably. The guide portion 44b has a tapered portion 44e (or stepped portion is also possible), at its middle portion, that inclines so as to be apart from the side plate 17 (that is, gradually increased in radius) as it goes toward outer circumference. The tapered portion 44e has a function to turn away grease, which is applied at a spline engaging portion of the hub portion 25a and the rotating shaft 7 of motor side, from the hysteresis unit 4 when the grease is dispersed by a centrifugal force. The guide portion 44b has at least one penetration hole portion 44c at a large radius portion in the end portion. The penetration hole portion 44c is a hole to discharge the grease guided to internal circumference by the tapered portion 44e to the outer circumferential side. The penetration hole portion 44c may be formed at the tapered portion 44e. A hysteresis function is stabilized and then noise vibration characteristics is stabilized by keeping the grease away from the hysteresis unit 4 by the tapered portion 44e and the penetration hole portion 44c. Other structure is the same as example 15.

According to example 16, as example 15 (example 9), a radius size of a bearing portion can be reduced, eccentricity of the apparatus can be reduced or suppressed, size accuracy can be increased, volume of the bearing portion can be reduced and influence of heat causes no problem. And the hysteresis function is stabilized and a noise vibration characteristic is stabilized because the grease is kept out of the hysteresis unit 4 by discharging the grease dispersed by a centrifugal force to an outer circumferential side through the penetration hole portion 44c. And an increase of a number of pieces can be curbed by integrating the thrust member 44 and the guide portion 44b which are easy to form and then fabrication cost can be reduced.

EXAMPLE 17

Figure 18:
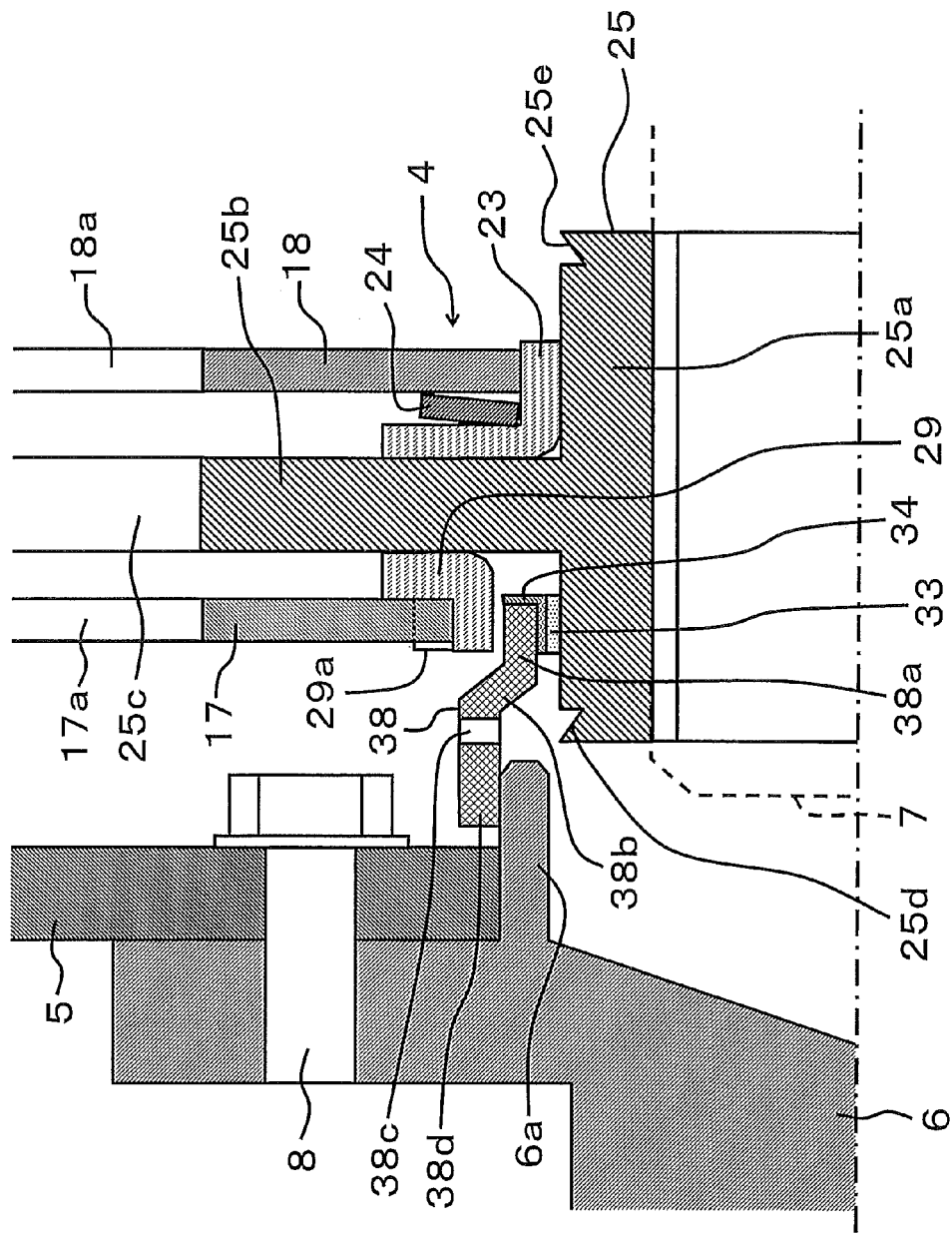
FIG. 18 shows an enlarged partial sectional view for illustrating a structure around a center of a shaft of a torque fluctuation absorber according to example 17.

A torque fluctuation absorber according to example 17 of the present disclosure will be explained with reference to a drawing. FIG. 18 shows an enlarged partial sectional view for illustrating a structure around a center of a shaft of a torque fluctuation absorber according to example 17 of the present disclosure.

Example 17 is a variation of example 12 (see FIG. 13) and the mounting portion 38d of the guide member 38 is mounted on an outer circumferential side of the extending portion 6a of the rotating shaft 6 of engine side, an outer circumferential surface of the guide portion 38a of the guide member 38 is apart from an internal circumferential surface of the thrust member 29, and a bush 33 made of a metal or resin is configured at an internal circumferential surface of the guide portion 38a via an elastic body 34 made of a rubber and the like. The bush 33 is in contact with the hub portion 25a retatably each other. The elastic body is adhered to the guide portion 38a and the bush 33. Other structure is the same as example 12.

According to example 17, it has the same effect as example 12 (example 9) and the hub member 25 is elastically supported by the elastic body 34 intervening between the guide portion 38a and the bush 33, and thus eccentricity of the hub member 25 can be reduced or suppressed and unbalanced force occurred at one of the bearings caused by three-point support of the rotating shaft 7 of motor side can be suppressed, and therefore a lifetime of the apparatus is not reduced.

EXAMPLE 18

Figure 19:
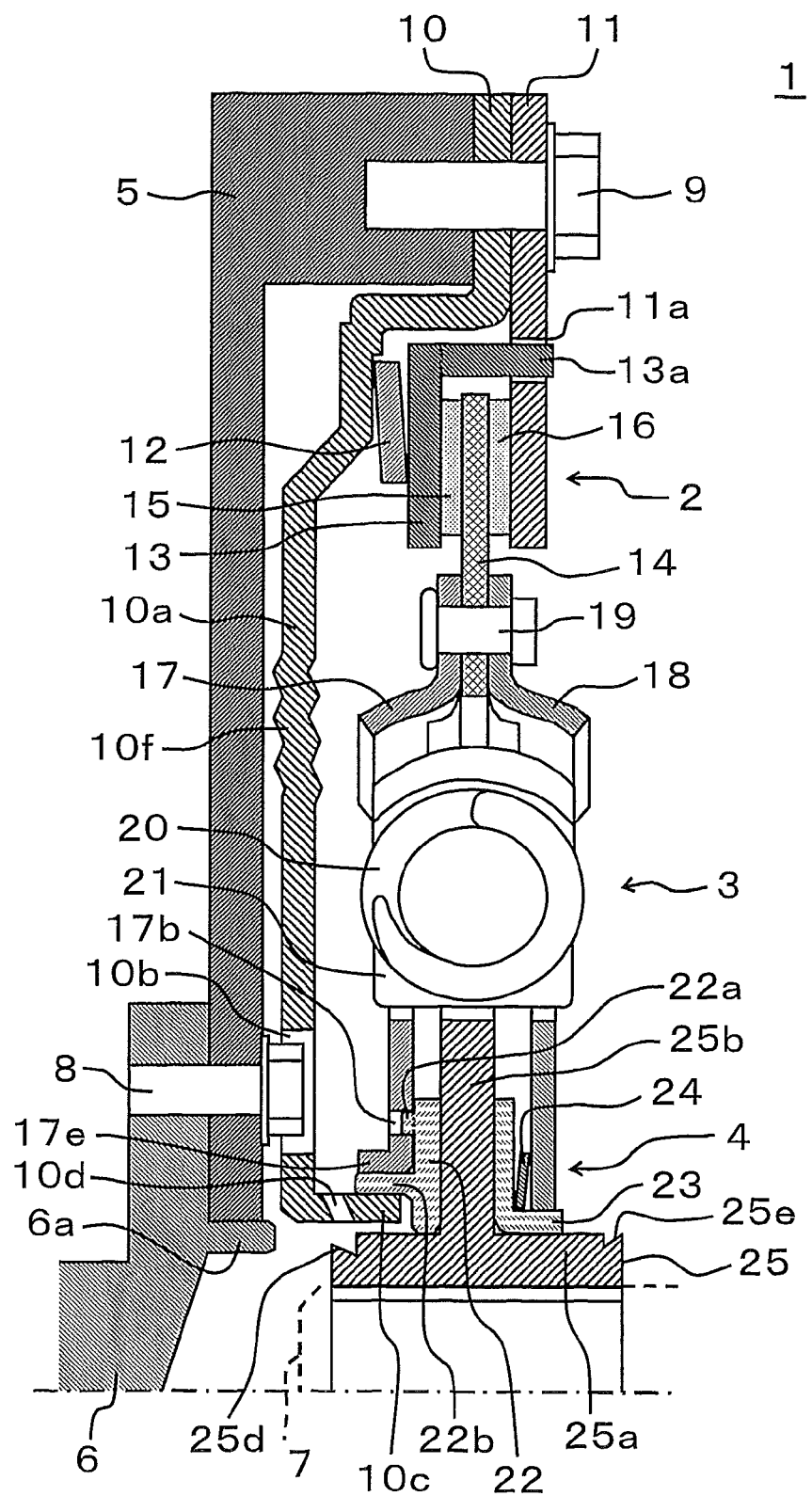
FIG. 19 shows a radial, partial sectional view for illustrating a structure of a torque fluctuation absorber according to example 18.

A torque fluctuation absorber according to example 18 of the present disclosure will be explained with reference to a drawing. FIG. 19 shows a radial, partial sectional view for illustrating a structure of a torque fluctuation absorber according to example 18 of the present disclosure.

According to example 18, a guide portion 10c is provided on the support plate 10 instead of the guide portion (designated as 5a in FIG. 2) of the flywheel (5 in FIG. 2) of example 1. The support plate 10 is an annular member arranged between the flywheel 5 and the cover plate 11, and is a structural member of the limiter unit 2. The support plate 10 is held on the flywheel 5 by the bolt 9 at an outer circumference thereof with the cover plate 11. The internal circumferential part of the support plate 10 is apart from the cover plate 11. The support plate 10 is in contact with the dish spring 12 with pushing force. The support plate 10 has an internal circumference extending portion 10a extending toward radially internal side. The internal circumference extending portion 10a has a hole portion 10b whose diameter is larger than a head portion of the bolt 8 at a corresponding position to the bolt 8 so as to limit an increase of the axial length of the apparatus. The internal circumference extending portion 10a has a cylindrical guide portion 10c extending from its internal circumferential edge portion toward the flange portion 25b. Around the end portion of the guide portion 10c is arranged between an internal circumferential surface of a cylindrical portion 22b of the thrust member 22 and an outer circumferential surface of the hub portion 25a of the hub member 25. And the guide portion 10c is in contact with the cylindrical portion 22b of the thrust member 22 and apart from the hub portion 25a, and supporting the side plate 17 rotatably via the thrust member 22 so as to prevent eccentricity of the side plate 17 via the thrust member 22. The guide portion 10c has at least one penetration hole portion 10d around the end portion thereof. The penetration hole portion 10d is a hole to discharge grease at internal circumference to outer circumference. The penetration hole portion 10d inclines so as to be apart from the damper unit 3 (hysteresis unit 4) as it goes from internal circumference to outer circumference. A hysteresis function is stabilized and then noise vibration characteristics is stabilized by keeping the grease away from the hysteresis unit 4 by the penetration hole portion 10d. Preferably, an elastic body such as a metal, resin, carbon fiber and the like is used for the support plate 10 so as to permit a micro displacement at the guide portion 10c. The support plate 10 has an irregular portion 10f that is formed unevenly at a predetermined portion on the internal circumference extending portion 10a. The irregular portion 10f has a role to align the coupling by producing a prescribed displacement (radial offset) with generating a resistant force when the guide portion 10c supports the side plate 17 via the thrust member 22. The irregular portion 10f can be formed by a press molding when the support plate 10 is made of metal and when the support plate 10 is made of a resin or carbon fiber, the irregular portion 10f is formed at molding simultaneously.

The thrust member 22 is arranged between the side plate 17 and the flange portion 25b and is in contact with the flange portion 25b slidably with pushing force. The thrust member 22 has a projecting portion 22a which is to be inserted in a hole portion 17b of the side plate 17. The projecting portion 22a has a role to prevent the thrust member 22 from rotating against the side plate 17. The thrust member 22 has the cylindrical portion 22b intervening between a cylindrical portion 17e formed at an internal circumferential edge portion of the side plate 17 and the guide portion 10c of the support plate 10. The cylindrical portion 22b is in contact with the guide portion 10c of the support plate 10 slidably. An internal circumferential edge portion of the thrust member 22 is in contact with an outer circumferential surface of the hub portion 25a of the hub member 25 slidably. Other structure is the same as example 1.

According to example 18, as example 1, a radius size of a bearing portion can be reduced, eccentricity of the apparatus can be reduced or suppressed, size accuracy can be increased, volume of the bearing portion can be reduced, influence of heat causes no problem, the hysteresis function can be stabilized and a noise vibration characteristic can be stabilized. Using an elastic body for the guide member 27 is of cost advantage compared with using a bearing. Since the support plate 10 permits a micro displacement with generating a resisting force, eccentricity can be reduced or suppressed and unbalanced force occurred at one of the bearings caused by three-point support of the rotating shaft 7 of motor side can be suppressed and thus a lifetime of the apparatus is not reduced.

EXAMPLE 19

Figure 20:
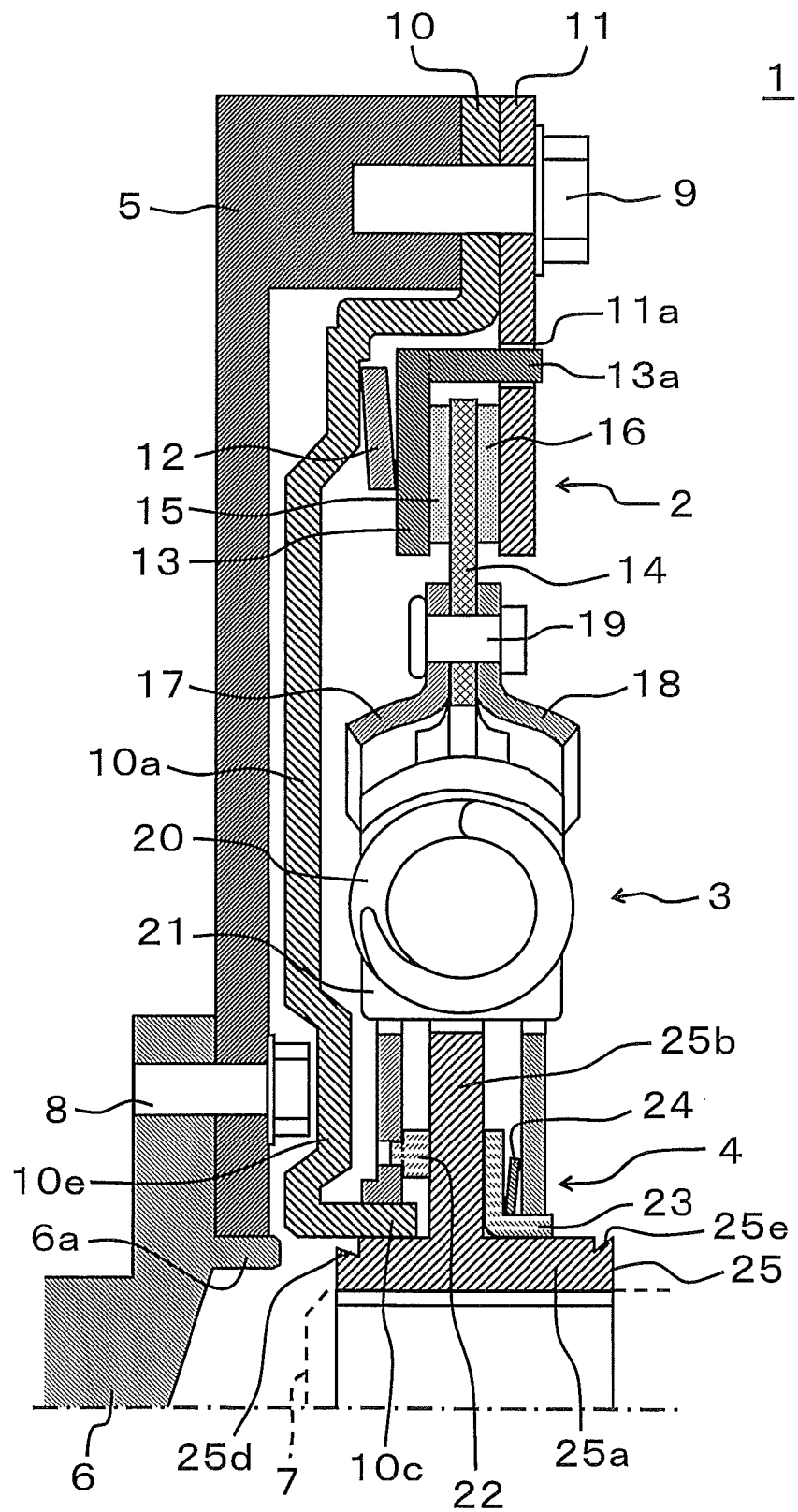
FIG. 20 shows a radial, partial sectional view for illustrating a structure of a torque fluctuation absorber according to example 19.

A torque fluctuation absorber according to example 19 of the present disclosure will be explained with reference to a drawing. FIG. 20 shows a radial, partial sectional view for illustrating a structure of a torque fluctuation absorber according to example 19 of the present disclosure.

Example 19 is a variation of example 18. The guide portion 10c is provided on the support plate 10 as example 18 but a cavity portion 10e avoiding the bolt 8 is formed instead of the hole portion (designated as 10b in FIG. 19) for attachment the bolt 8 and the penetration hole portion (designated as 10d in FIG. 19) for discharging grease is eliminated. The support plate 10 has the internal circumference extending portion 10a extending toward radially internal side. The internal circumference extending portion 10a has the cavity portion 10e avoiding the bolt 8 at a position corresponding to the bolt 8 so as to limit an increase of the axial length of the apparatus. The internal circumference extending portion 10a has a cylindrical guide portion 10c extending from its internal circumferential edge portion toward the flange portion 25b. Around the end portion of the guide portion 10c is arranged between an internal circumferential surface of side plate 17 and an outer circumferential surface of the hub portion 25a of the hub member 25. And the guide portion 10c is in contact with the side plate 17 and the hub portion 25a, and supporting the side plate 17 and the hub member 25 rotatably so as to prevent eccentricity of the side plate 17 and the hub member 25. Preferably an elastic body such as a metal, resin, carbon fiber and the like is used for the support plate 10 so as to permit a micro displacement at the guide portion 10c. Other structure is the same as example 18.

According to example 19, an invasion of an extraneous matter such as grease in the hysteresis unit 4 can be prevented by covering the hysteresis unit 4 with the internal circumference extending portion 10a of the support plate 10 as well as obtaining the same effect as example 18.

EXAMPLE 20

Figure 21:
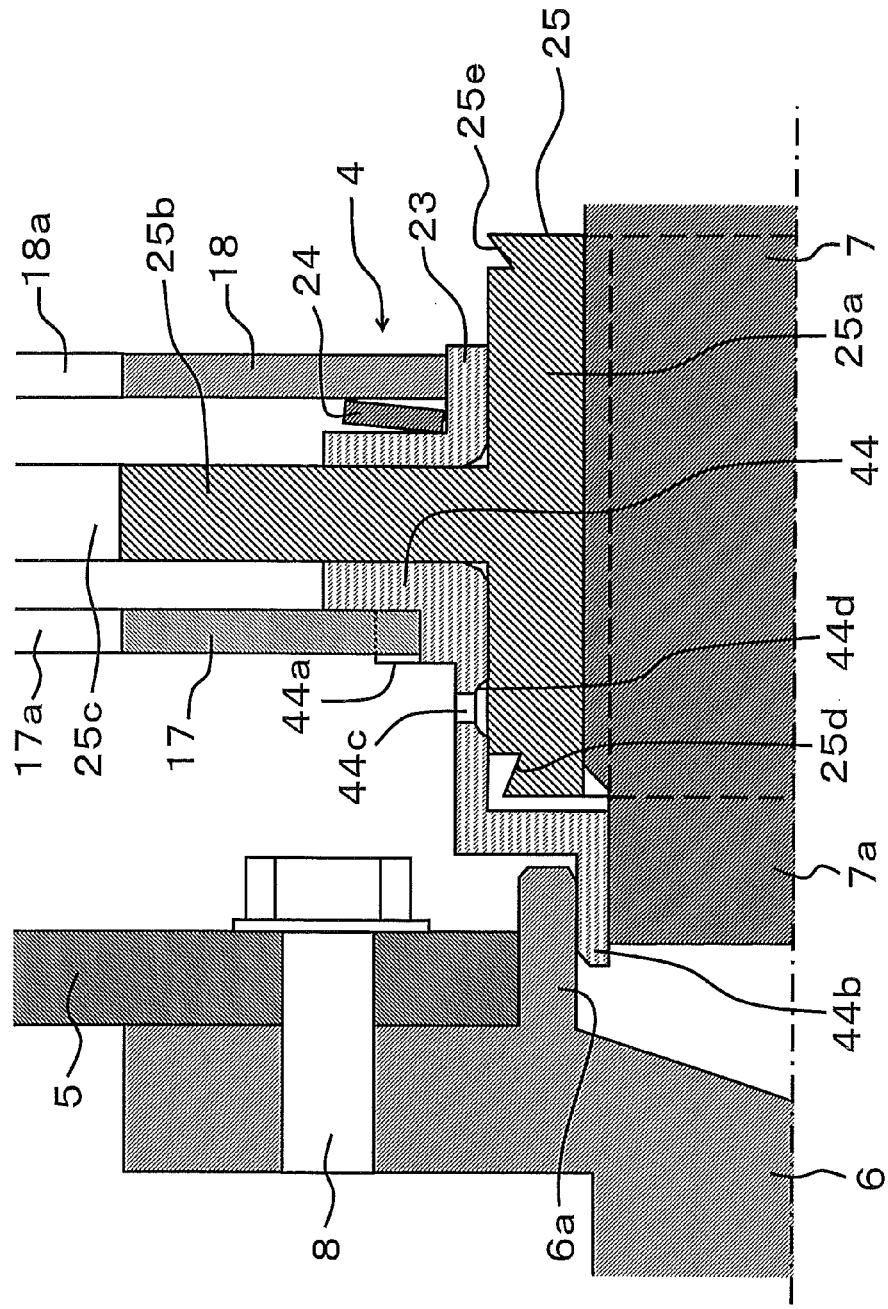
FIG. 21 shows an enlarged partial sectional view for illustrating a structure around a center of a shaft of a torque fluctuation absorber according to example 20.

A torque fluctuation absorber according to example 20 of the present disclosure will be explained with reference to a drawing. FIG. 21 shows an enlarged partial sectional view for illustrating a structure around a center of a shaft of a torque fluctuation absorber according to example 20 of the present disclosure.

Example 20 is a variation of example 15 (see FIG. 16). A penetration hole portion 44c and a groove portion 44d for discharge of grease are formed on the guide portion 44b of the thrust member 44 as example 15, and an elongated portion 7a, which is elongating from an edge on the side of the rotating shaft 6 of engine side of the rotating shaft 7 of motor side, is formed and the end portion of the guide portion 44b located between the elongated portion 6a of the rotating shaft 6 of engine side and the elongated portion 7a of the rotating shaft 7 of motor side.

The thrust member 44 is a structural member of the hysteresis unit 4 and an annular member arranged between the side plate 17 and the hub member 25. The thrust member 44 is axially arranged between the side plate 17 and the flange portion 25b and is in contact with the flange portion 25b slidably with pushing force. The thrust member 44 has a rotation-stop portion 44a which is inserted in a pit portion formed at an internal circumferential end portion of the side plate 17. The rotation-stop portion 44a has a role to prevent the thrust member 44 from rotating against the side plate 17. The thrust member 44 is also arranged between the side plate 17 and the hub portion 25a and is in contact with the hub portion 25a relatively rotatably. The thrust member 44 has a guide portion 44b extending toward a rotating shaft 6 of engine side from between the side plate 17 and the hub portion 25a. The guide portion 42b covers the groove portion 25d formed on the hub portion 25a. An end portion of the guide portion 4b extends between the end portion of the elongated portion 6a and an axial edge surface of the hub portion 25a and located between an internal circumferential surface of the elongated portion 6a of the rotating shaft 6 of engine side and the elongated portion 7a of the rotating shaft 7 of motor side. The guide portion 44b is in contact with the elongated portions 6a and 7a relatively rotatably. The guide portion 44b has the groove portion 44d formed in circumferential direction at a position of an internal circumferential surface on the flange portion 25b side from the groove portion 25d. The guide portion 44b has at least one penetration hole portion 44c in an area where the groove portion 44d is formed. The penetration hole portion 44c is a hole to discharge grease, which is dispersed by a centrifugal force and collected at the groove portion 44d by way of an interface of the hub portion 25a and the guide portion 44b, to an outer circumferential side. Since the grease is kept out of the hysteresis unit 4 with the aid of the penetration hole portion 44c and the groove portion 44d, the hysteresis function is stabilized and a noise vibration characteristic is stabilized. Other structure is the same as example 15.

According to example 20, a radius size of a bearing portion can be reduced, eccentricity of the apparatus can be reduced or suppressed, size accuracy can be increased, volume of the bearing portion can be reduced, influence of heat causes no problem, a hysteresis function is stabilized and then noise vibration characteristics is stabilized. And eccentricity of the rotating shaft 6 of engine side and the rotating shaft 7 of motor side is prevented by the thrust member 44.

EXAMPLE 21

Figure 22:
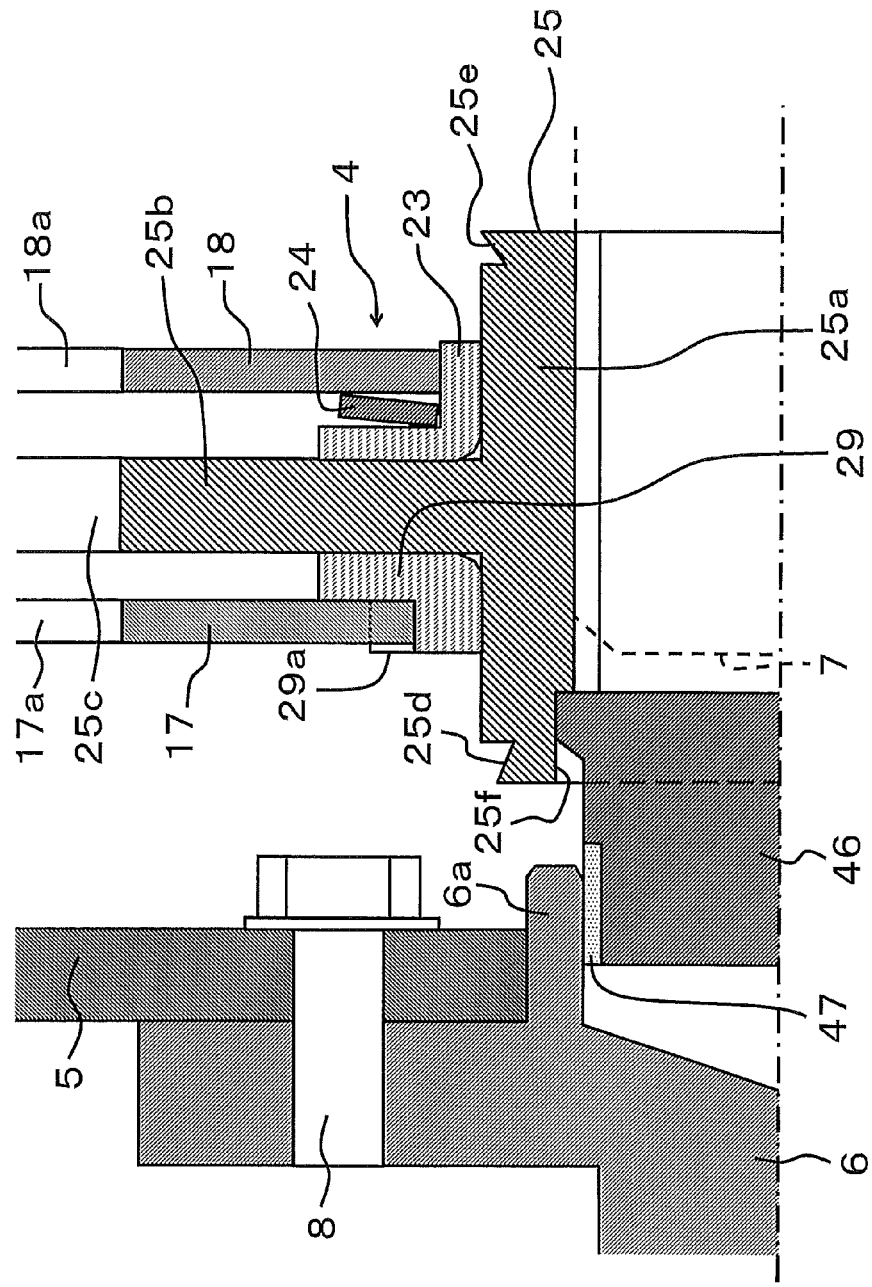
FIG. 22 shows an enlarged partial sectional view for illustrating a structure around a center of a shaft of a torque fluctuation absorber according to example 21.

A torque fluctuation absorber according to example 21 of the present disclosure will be explained with reference to a drawing. FIG. 22 shows an enlarged partial sectional view for illustrating a structure around a center of a shaft of a torque fluctuation absorber according to example 21 of the present disclosure.

According to example 21, a guide member 46 which is attached to the hub member 25 is provided instead of the guide portion (designate as 5a in FIG. 2) of the flywheel (5 in FIG. 2) of example 1. The hub member 25 has a stepped pit portion 25f near the rotating shaft 6 of engine side on an internal circumferential surface of the hub portion 25a. The guide member 46 is mounted on the stepped pit portion 25f. The guide member 46 elongates toward the rotating shaft 6 of engine side and arranged on an internal circumference of the elongated portion 6a of the rotating shaft 6 of engine side. Preferably, an elastic body such as a metal, resin, carbon fiber, etc. is used for the guide member 46 so as to permit a micro displacement of the rotating shaft 6 of engine side and the hub portion 25a. A bush 47 located between the guide member 46 and the elongated portion 6a. The bush 47 is adhered to the guide member 46 and in contact with the elongated portion 6a slidably. The thrust member 29 is rotation-stopped on the side plate 17, is in contact with the flange portion 25b slidably with a pushing force and in contact with the hub portion 25a slidably. The rotating shaft 7 of motor side is engaged with the hub portion 25a by a spline connection and an edge portion on the side of the rotating shaft 6 of engine side is apart from the guide member 46. Other structure is the same as example 1.

According to example 21, as example 1, a radius size of a bearing portion can be reduced, eccentricity of the apparatus can be reduced or suppressed, size accuracy can be increased, volume of the bearing portion can be reduced, influence of heat causes no problem, the hysteresis function can be stabilized and a noise vibration characteristic can be stabilized. Using an elastic body for the guide member 27 is of cost advantage compared with using a bearing. Since the guide member 46 permits a micro displacement with generating a resisting force, eccentricity can be reduced or suppressed and unbalanced force occurred at one of the bearings caused by three-point support of the rotating shaft 7 of motor side can be suppressed and thus a lifetime of the apparatus is not reduced.

EXAMPLE 22

Figure 23:
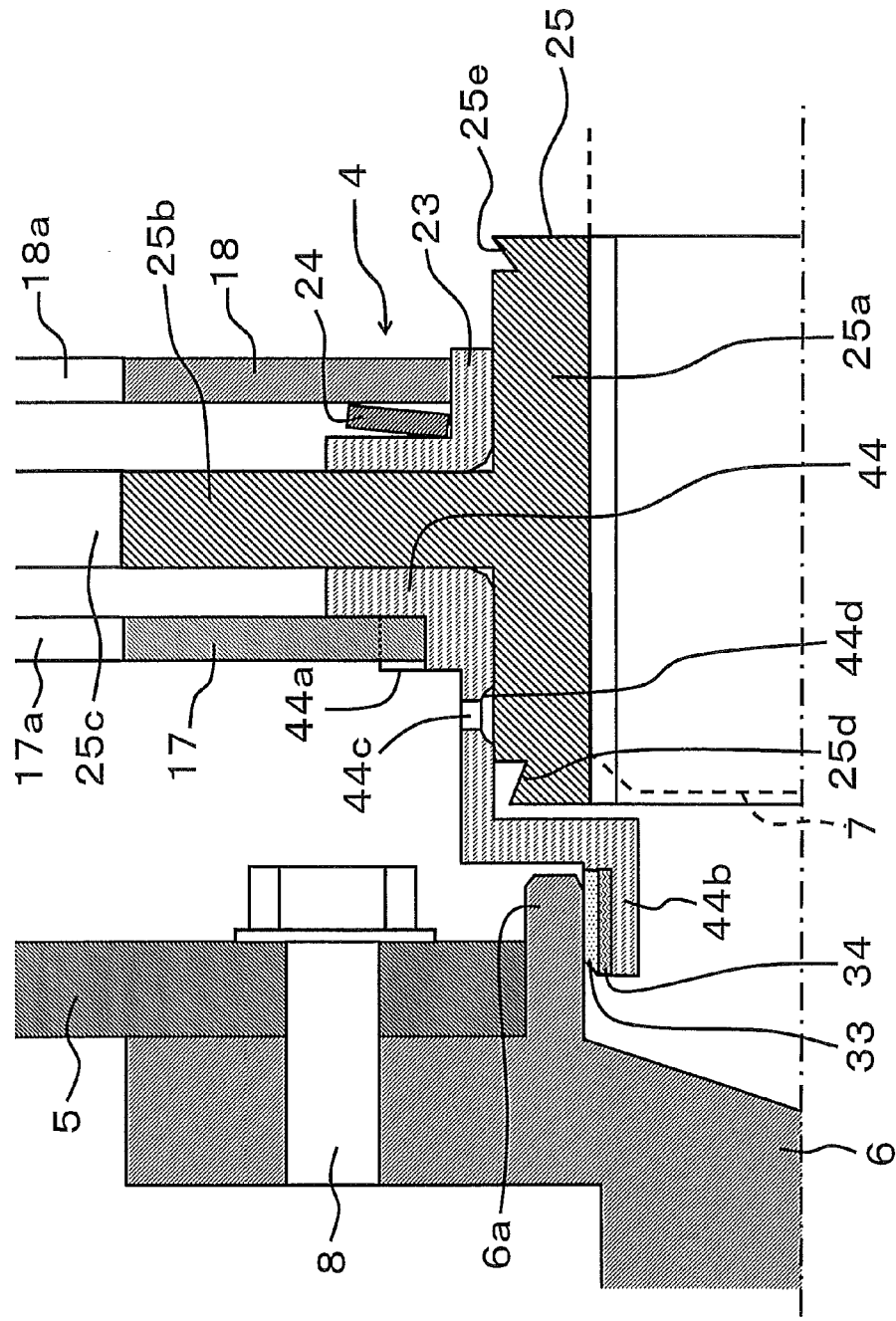
FIG. 23 shows an enlarged partial sectional view for illustrating a structure around a center of a shaft of a torque fluctuation absorber according to example 22.

A torque fluctuation absorber according to example 22 of the present disclosure will be explained with reference to a drawing. FIG. 23 shows an enlarged partial sectional view for illustrating a structure around a center of a shaft of a torque fluctuation absorber according to example 22 of the present disclosure.

Example 22 is a variation of example 20 (see FIG. 21). A penetration hole portion 44c and a groove portion 44d for discharge of grease are formed on the guide portion 44b of the thrust member 44 as example 15, an elongated portion (designated as 7a in FIG. 21) is not formed at the edge on the side of the rotating shaft 6 of engine side and the end portion of the guide portion 44b is arranged at an internal circumference of the elongated portion 6a of the rotating shaft 6 of engine side, and a bush 33 made of a metal or resin is formed on an outer circumferential surface of the guide portion 44b via an elastic body 34 made of a rubber, and the like. The bush 33 is in contact with the elongated portion 6a relatively slidably. The elastic body 34 is adhered to the guide portion 44b and the bush 33. Other structure is the same as example 20.

According to example 22, as example 20, a radius size of a bearing portion can be reduced, eccentricity of the apparatus can be reduced or suppressed, size accuracy can be increased, volume of the bearing portion can be reduced, influence of heat causes no problem, the hysteresis function can be stabilized and a noise vibration characteristic can be stabilized. Since the elastic body 34 located between the guide portion 44b and the bush 33, the hub member 25 is elastically supported and thus eccentricity of the hub member can be reduced and suppressed and unbalanced force occurred at one of the bearings caused by three-point support of the rotating shaft 7 of motor side can be suppressed and thus a lifetime of the apparatus is not reduced.

EXAMPLE 23

Figure 24:
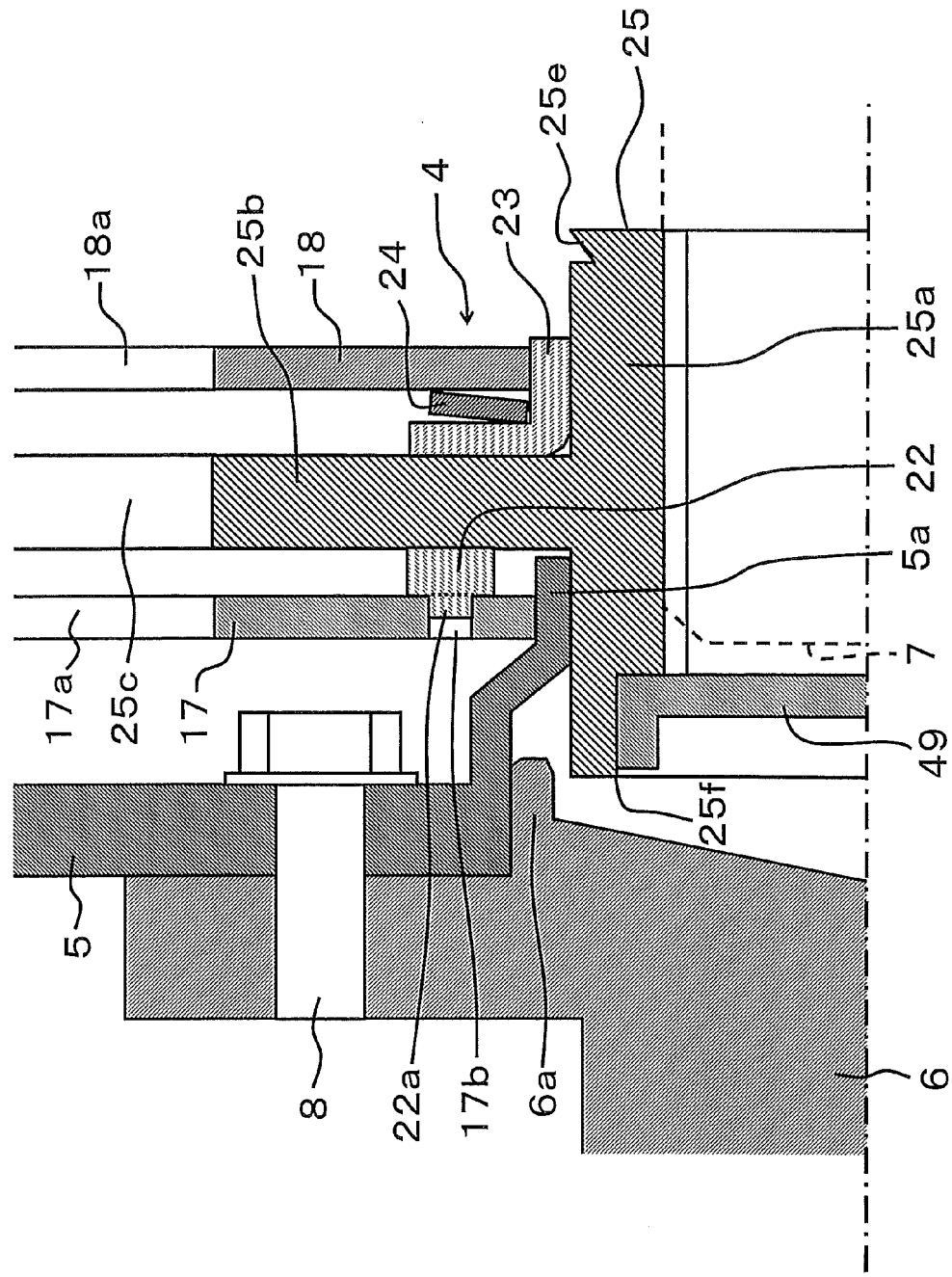
FIG. 24 shows an enlarged partial sectional view for illustrating a structure around a center axis of a shaft of a torque fluctuation absorber according to example 23.

A torque fluctuation absorber according to example 23 of the present disclosure will be explained with reference to a drawing. FIG. 24 shows an enlarged partial sectional view for illustrating a structure around a center of a shaft of a torque fluctuation absorber according to example 23 of the present disclosure.

Example 23 is a variation of example 1 and a lid member 49 is provided for containing grease applied to a spline connection portion of the hub portion 25a and the rotating shaft 7 of motor side. The hub member 25 has a stepped pit (recess) portion 25f at an area in the vicinity of the rotating shaft 6 of engine side of an internal circumferential surface of the hub portion 25a. The lid member 49 is attached on the stepped pit portion 25f. The lid member 49 covers an opening on the side of the rotating shaft 6 of engine side of the hub portion 25a. An axial gap between the rotating shaft 6 of engine side and the hub portion 25a is designed so that the lid member 49 is not disengaged with the hub portion 25a completely even when the lid member 49 moved axially against the hub portion 25a. That is, an axial size of the lid member 49 is designed larger than a length of the axial gap between the rotating shaft 6 of engine side and the hub portion 25a. The lid member 49 is made of an elastic body such as a metal, resin, carbon fiber, and the like. Because the lid member 49 is provided, the groove portion 25d for discharging grease on the hub portion 25a is unnecessary and also the penetration hole portion (designated as 5c in FIG. 2) for discharging grease is unnecessary on the guide portion 5a of the flywheel 5. Other structure is the same as example 1.

According to example 23, it has the same effect as example 1 and also the hysteresis function can be stabilized and a noise vibration characteristic can be stabilized because the grease is kept out of the hysteresis unit 4 by containing the grease applied to a spline connection portion of the hub portion 25a and the rotating shaft 7 of motor side using the lid member 49.

EXAMPLE 24

Figure 25:
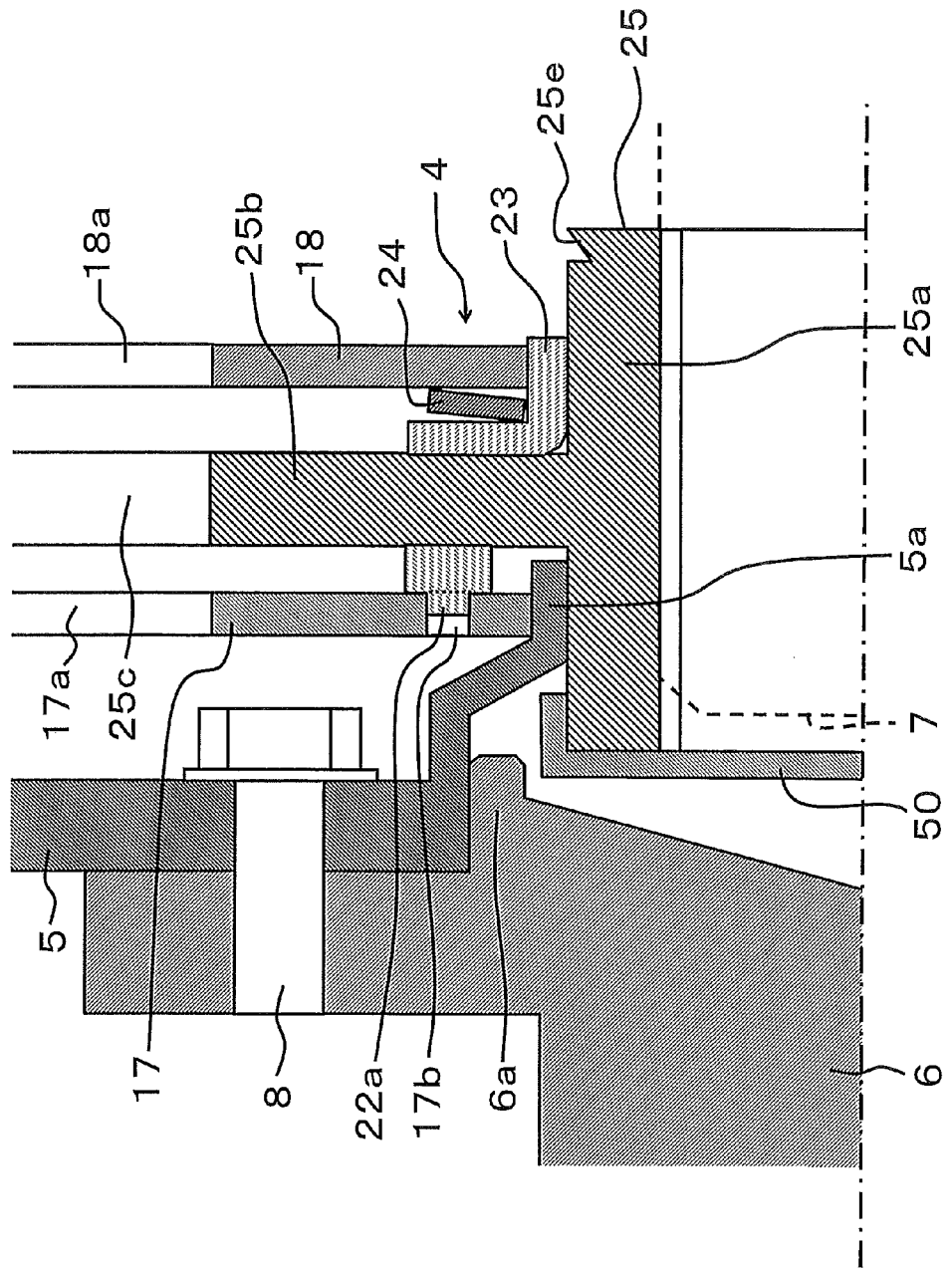
FIG. 25 shows an enlarged partial sectional view for illustrating a structure around a center axis of a shaft of a torque fluctuation absorber according to example 24.

A torque fluctuation absorber according to example 24 of the present disclosure will be explained with reference to a drawing. FIG. 25 shows an enlarged partial sectional view for illustrating a structure around a center of a shaft of a torque fluctuation absorber according to example 24 of the present disclosure.

Example 24 is a variation of example 1 and a lid member 50 is provided for containing grease applied to a spline connection portion of the hub portion 25a and the rotating shaft 7 of motor side. The lid member 50 is attached at an area in the vicinity of the rotating shaft 6 of engine side of an outer circumference of the hub portion 25a. The lid member 50 covers an opening on the side of the rotating shaft 6 of engine side of the hub portion 25a. An axial gap between the rotating shaft 6 of engine side and the hub portion 25a is designed so that the lid member 50 is not disengaged with the hub portion 25a completely even when the lid member 50 moved axially against the hub portion 25a. That is, an axial size of the lid member 50 is designed larger than a length of the axial gap between the rotating shaft 6 of engine side and the hub portion 25a. The lid member 50 is made of an elastic body such as a metal, resin, carbon fiber, and the like. Because the lid member 50 is provided, the groove portion (designated as 25d in FIG. 2) for discharging grease on the hub portion 25a is unnecessary and also the penetration hole portion (designated as 5c in FIG. 2) for discharging grease is unnecessary on the guide portion 5a of the flywheel 5. Other structure is the same as example 1.

According to example 24, it has the same effect as example 1 and also the hysteresis function can be stabilized and a noise vibration characteristic can be stabilized because the grease is kept out of the hysteresis unit 4 by containing the grease applied to a spline connection portion of the hub portion 25a and the rotating shaft 7 of motor side using the lid member 50.

EXAMPLE 25

Figure 26:
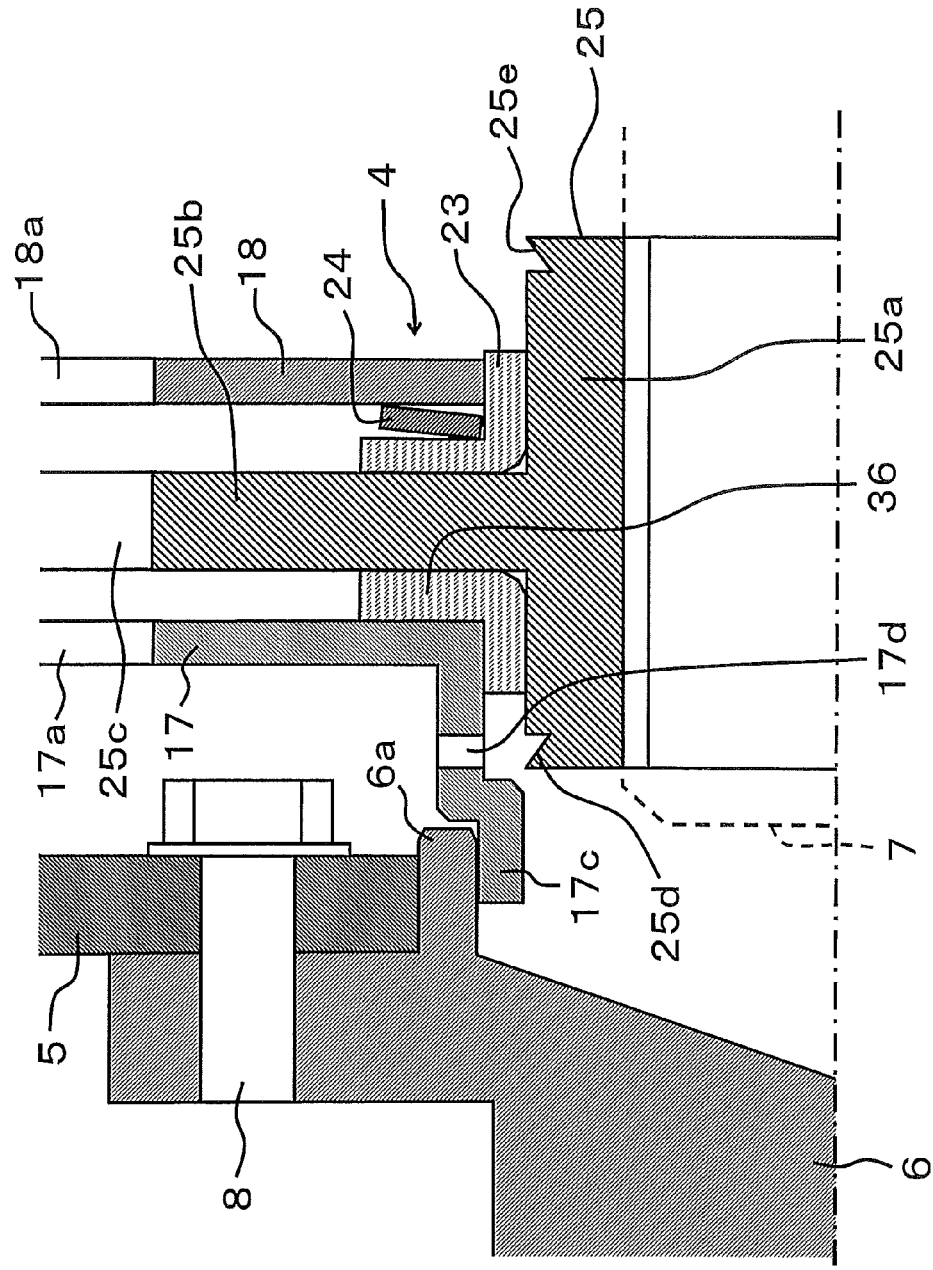
FIG. 26 shows an enlarged partial sectional view for illustrating a structure around a center axis of a shaft of a torque fluctuation absorber according to example 25.
Figure 27:
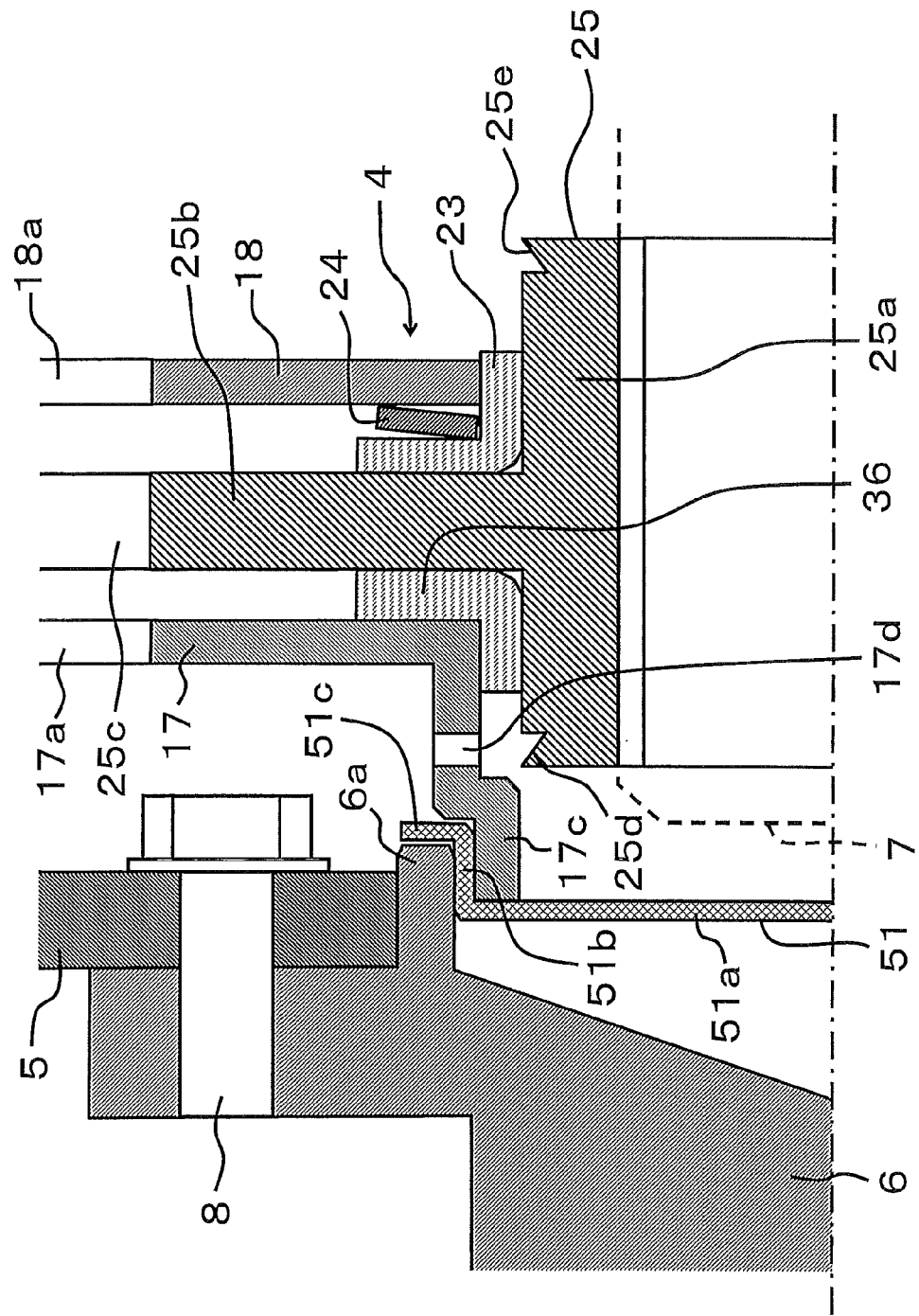
FIG. 27 shows an enlarged partial sectional view for illustrating a structure around a center axis of a shaft of a torque fluctuation absorber according to a modification of example 25.

A torque fluctuation absorber according to example 25 of the present disclosure will be explained with reference to drawings. FIG. 26 shows an enlarged partial sectional view for illustrating a structure around a center of a shaft of a torque fluctuation absorber according to example 25 of the present disclosure. FIG. 27 shows an enlarged partial sectional view for illustrating a structure around a center of a shaft of a torque fluctuation absorber according to a modification of example 25 of the present disclosure.

Example 25 is a variation of example 7 (see FIG. 8) and an end portion of the guide portion 17c of the side plate 17 is inserted on an internal circumference of the elongated portion 6a of the rotating shaft 6 of engine side instead of the flywheel 5 (see FIG. 26). The guide portion 17c is in contact with an internal circumferential surface of the elongated portion of the rotating shaft 6 of engine side and supported by the rotating shaft 6 of engine side rotatably, and as a result eccentricity of the side plate 17 is prevented. The guide portion 17c has at least one penetration hole portion 17d. The penetration hole portion 17d is a hole to discharge grease collected at radially internal side of the guide portion 17c to outer circumferential side when the grease applied to a spline engaging portion of the hub portion 25a and the rotating shaft 7 of motor side was dispersed by a centrifugal force. A thrust member 36 located in axial and radial space between the side plate 17 and the hub member 25. Other structure is the same as example 7.

The guide portion 17c is in contact with an internal circumferential surface of the elongated portion 6a of the rotating shaft 6 of engine side in FIG. 26, it is also conceivable to interpose a bush (a bush portion 51b of a bush member 51) made of an elastic body between an outer circumferential surface of the guide portion 17c and an internal circumferential surface of the elongated portion 6a as shown in FIG. 27. The bush portion 51b has a role to support the guide portion 17c of the side plate 17 on the elongated portion 6a of the rotating shaft 6 of engine side relatively rotatably. The bush member 51 has a lid portion 51a to cover an opening of the guide portion 17c on one end of the bush portion 51b and has a flange portion 51c elongating outer circumferentially on the other end of the bush portion 51b. The flange portion 51c has a role to prevent the bush member 51 from falling down from the guide portion 17c and is arranged between an end portion of the elongated portion 6a of the rotating shaft 6 of engine side and a stepped portion (or a body of the side plate 17) of the guide portion 17c.

According to example 25, as example 7, a radius size of a bearing portion can be reduced, eccentricity of the apparatus can be reduced or suppressed, size accuracy can be increased, volume of the bearing portion can be reduced, influence of heat causes no problem, the hysteresis function can be stabilized and a noise vibration characteristic can be stabilized.

EXAMPLE 26

Figure 28:
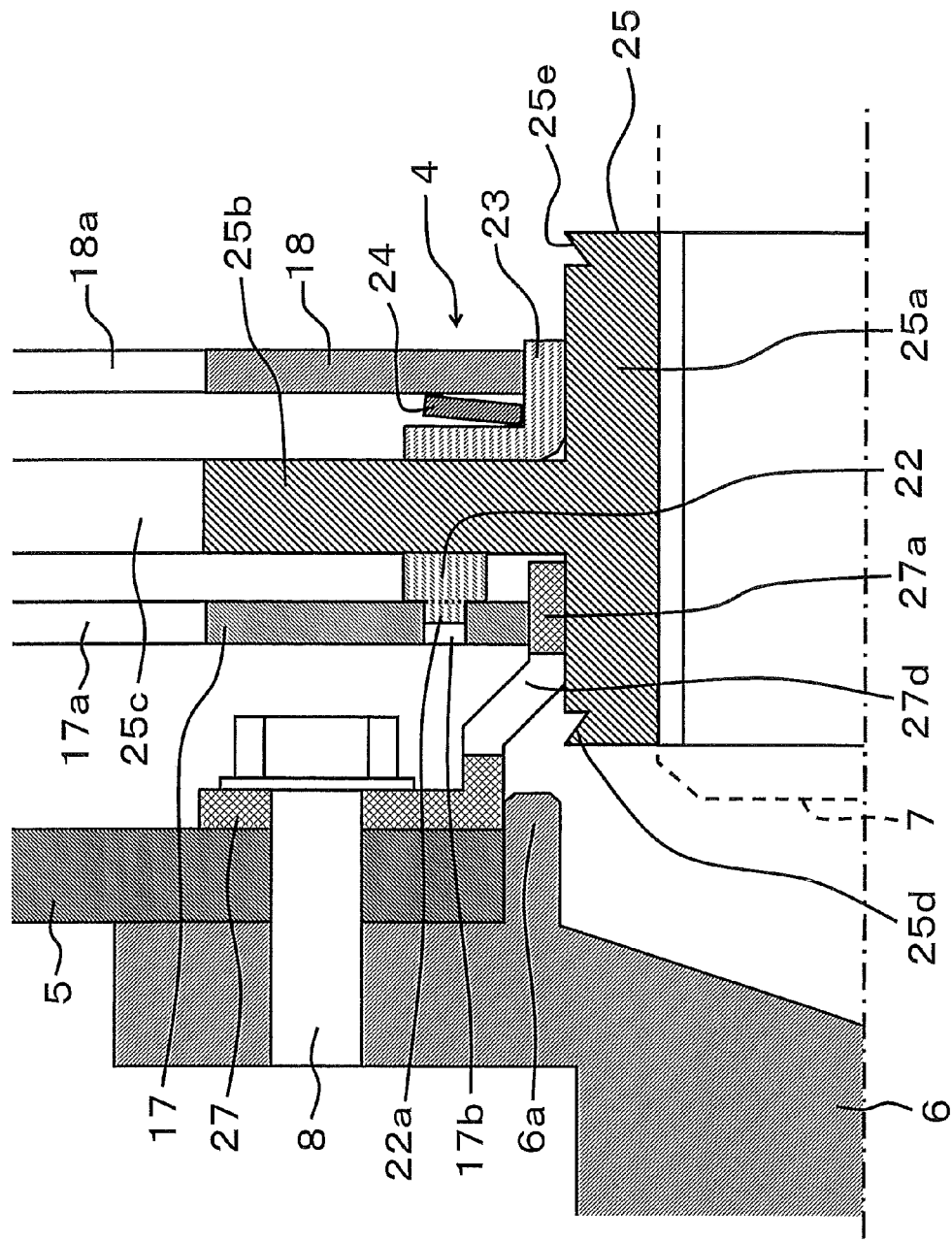
FIG. 28 shows an enlarged partial sectional view for illustrating a structure around a center axis of a shaft of a torque fluctuation absorber according to example 26.
Figure 29A:
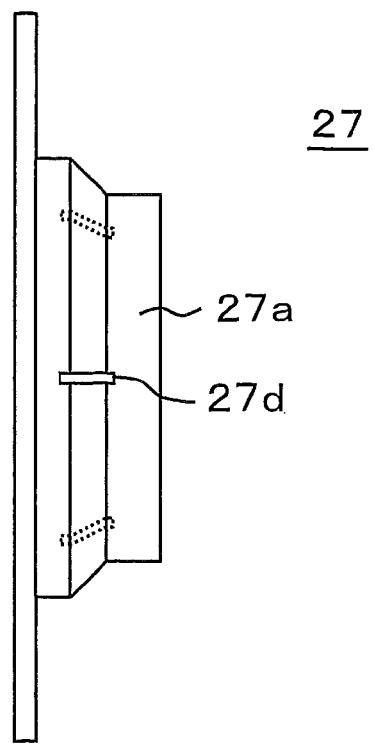
FIG. 29A is a side view and FIG. 29B is a front view, respectively, for illustrating a structure of a guide member of a torque fluctuation absorber according to example 26.
Figure 29B:
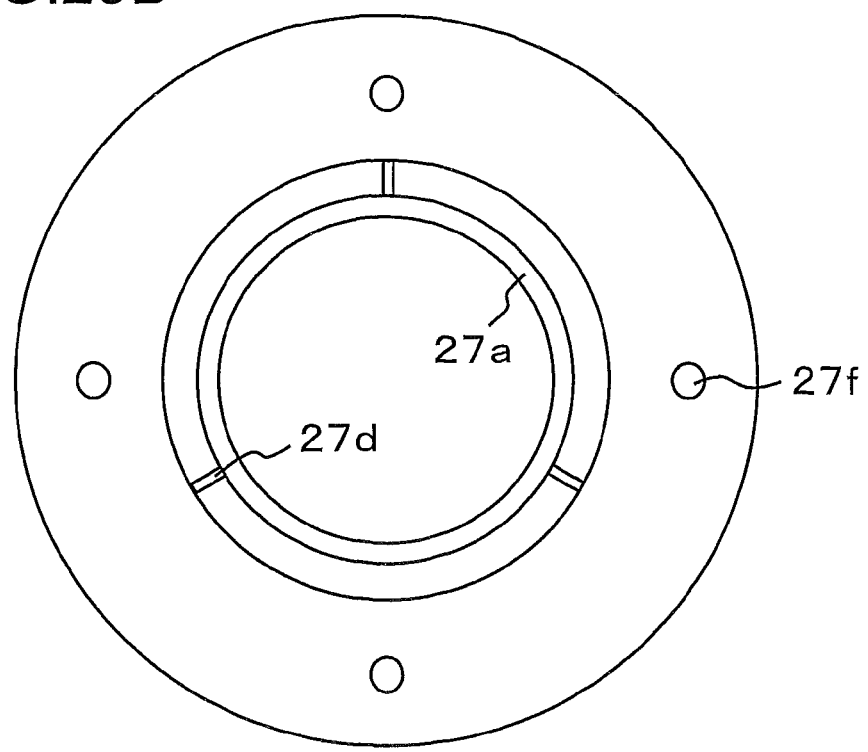
Figure 30:
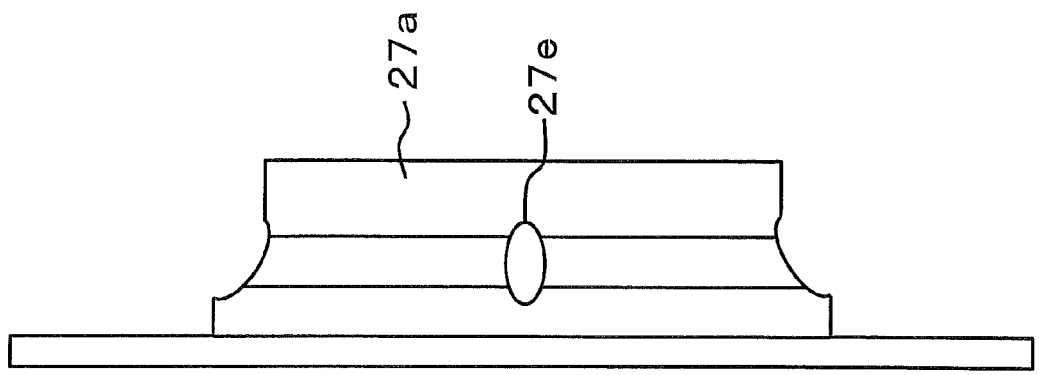
FIG. 30 is a side view for illustrating a structure of a modification of a guide member of a torque fluctuation absorber according to example 26.

A torque fluctuation absorber according to example 26 of the present disclosure will be explained with reference to drawings. FIG. 28 shows an enlarged partial sectional view for illustrating a structure around a center of a shaft of a torque fluctuation absorber according to example 26 of the present disclosure. FIG. 29A is a side view and FIG. 29B is a front view, respectively, for illustrating a structure of a guide member of a torque fluctuation absorber according to example 26 of the present disclosure. FIG. 30 is a side view for illustrating a structure of a modification of a guide member of a torque fluctuation absorber according to example 26 of the present disclosure.

Example 26 is a variation of example 2 (see FIG. 3) and a slit 27d is formed at a prescribed position of the guide portion 27a of the guide member 27 (see FIGS. 28 and 29). The slit 27d has a role to make the guide portion 27a bend so that the guide member 27 permits a micro displacement of the side plate 17 or the hub member 25 with generating a resisting force. Other structure is the same as example 2.

The slit 27d is formed on the guide portion 27a in FIG. 29. However, a circle or oval hole 27e may be formed on the guide portion 27a as shown in FIG. 30. Such a slit 27d or hole 27e can be formed in other examples.

According to example 26, as example 2, a radius size of a bearing portion can be reduced, eccentricity of the apparatus can be reduced or suppressed, size accuracy can be increased, volume of the bearing portion can be reduced, influence of heat causes no problem, the hysteresis function can be stabilized and a noise vibration characteristic can be stabilized. Using an elastic body for the guide member 27 is of cost advantage compared with using a bearing. A modulus of elasticity of the guide member 27 can be adjusted by adjusting a shape or a number of the slit(s) or hole(s) formed on the guide member 27. Since the guide member 27 permits a micro displacement with generating a resisting force, eccentricity can be reduced or suppressed and unbalanced force occurred at one of the bearings caused by three-point support of the rotating shaft 7 of motor side can be suppressed and thus a lifetime of the apparatus is not reduced.

EXAMPLE 27

Figure 31:
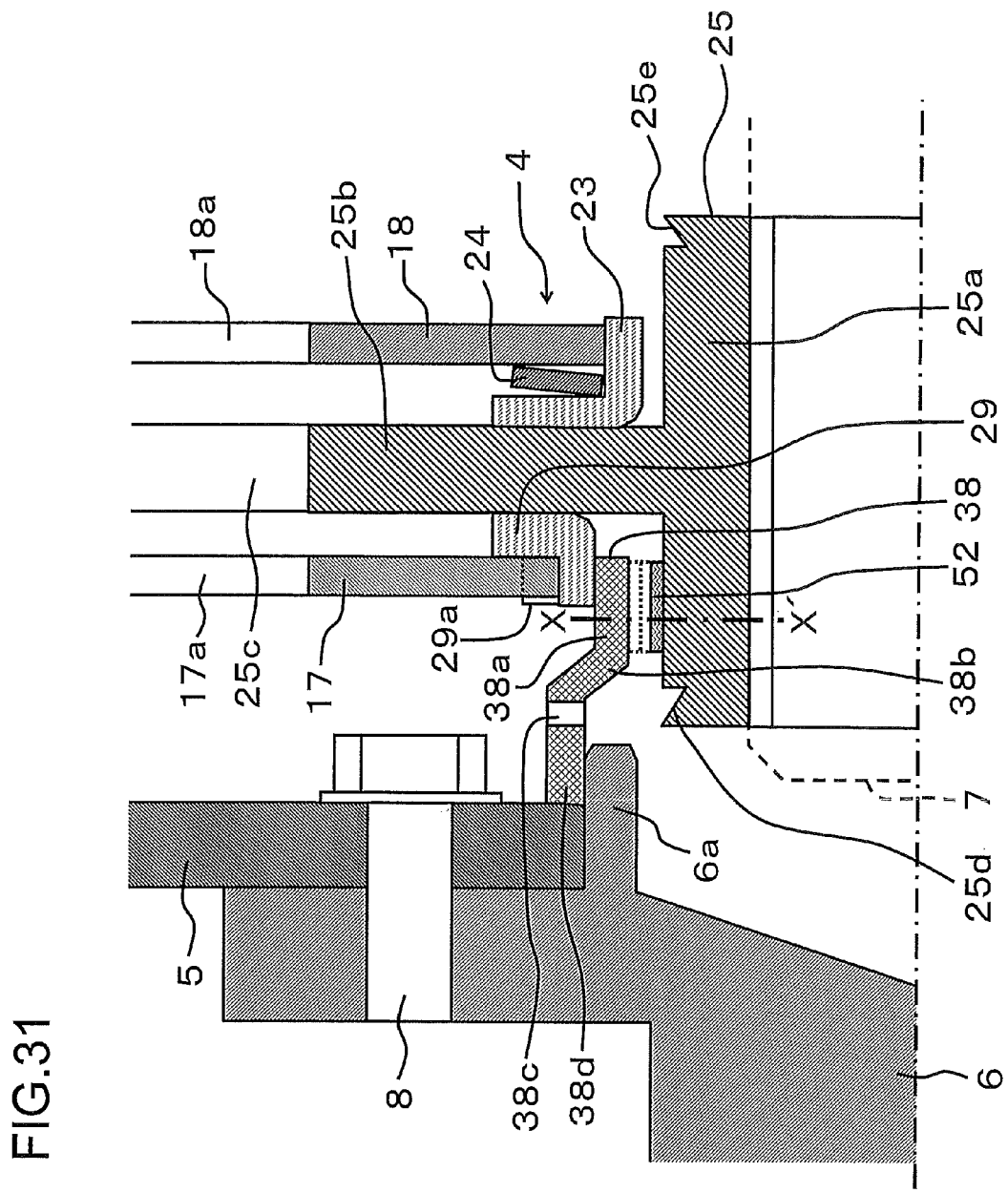
FIG. 31 shows an enlarged partial sectional view for illustrating a structure around a center axis of a shaft of a torque fluctuation absorber according to example 27.
Figure 32:
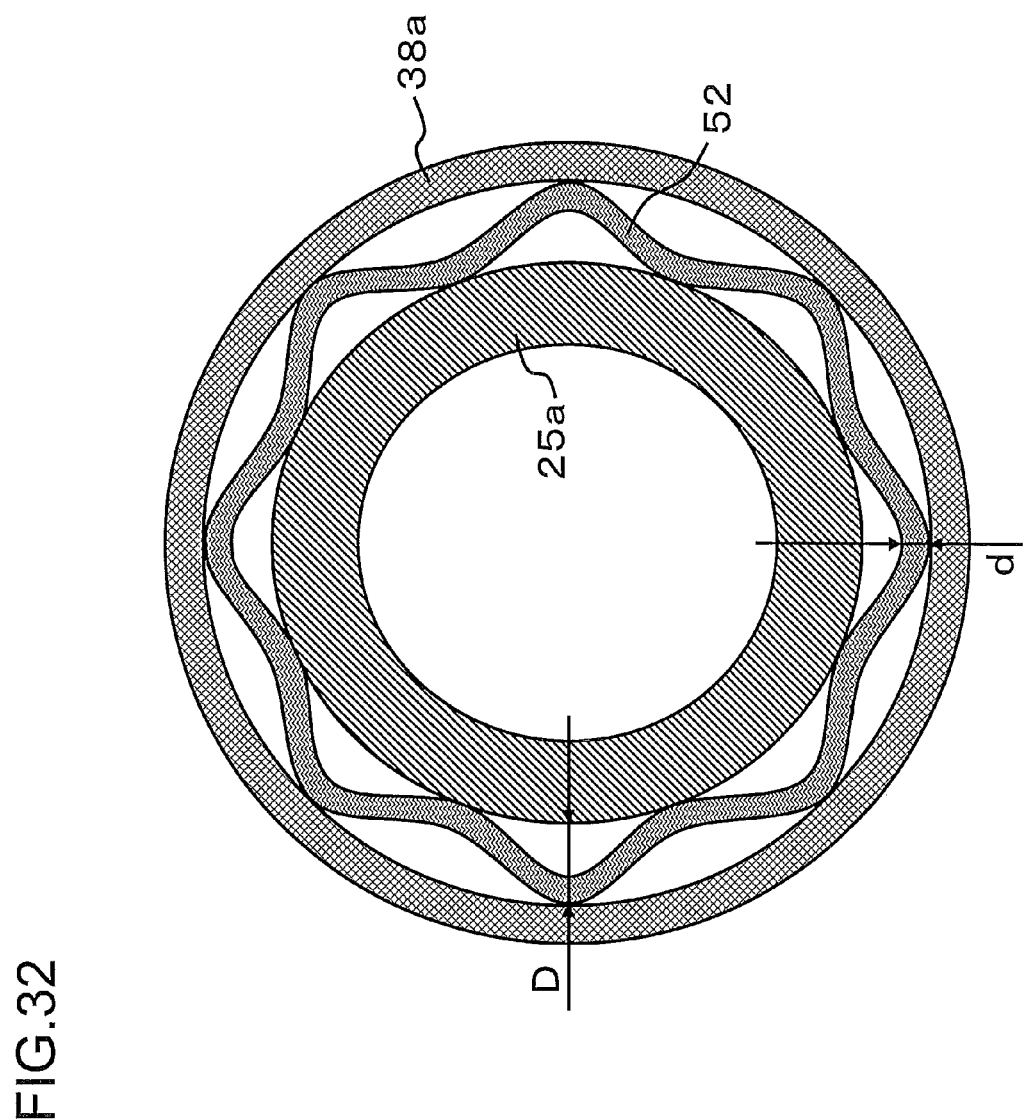
FIG. 32 shows a cross-sectional view through X-X' of FIG. 31.
Figure 33:
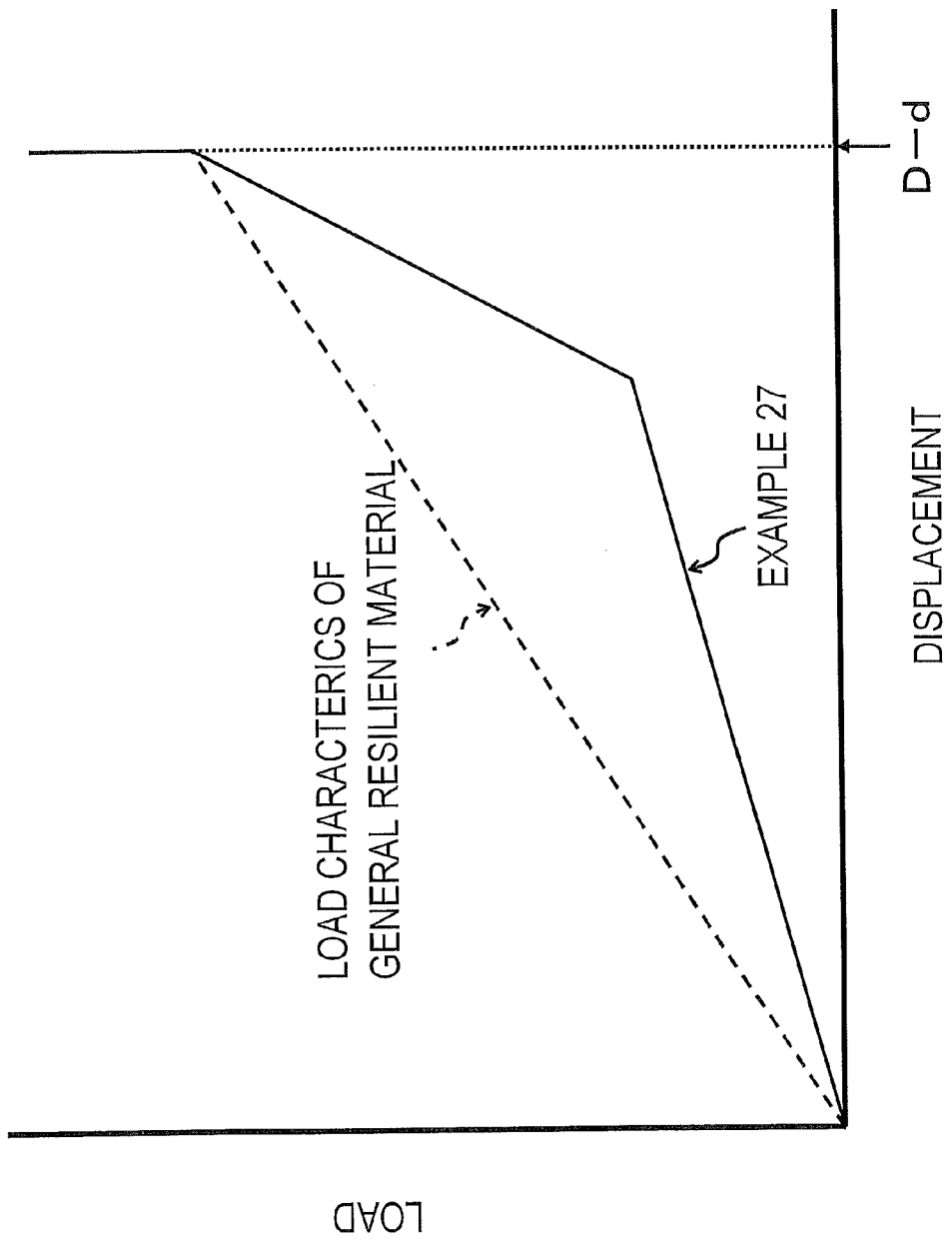
FIG. 33 is a graph illustrating a load characteristic of an elastic member of a torque fluctuation absorber according to example 27.

A torque fluctuation absorber according to example 27 of the present disclosure will be explained with reference to drawings. FIG. 31 shows an enlarged partial sectional view for illustrating a structure around a center of a shaft of a torque fluctuation absorber according to example 27 of the present disclosure. FIG. 32 shows a cross-sectional view through X-X' of FIG. 31. FIG. 33 is a graph illustrating a load characteristic of an elastic member of a torque fluctuation absorber according to example 27 of the present disclosure.

Example 27 is a variation of example 11 (see FIG. 12) and an elastic member 52 is located in a gap between the guide portion 38a and the hub portion 25a (see FIG. 31). The elastic member 52 permits a micro displacement of the hub member 25 with generating a resistant force. The elastic member 52 has a function as a bush. The elastic member 52 is configured by making a leaf spring in annular shape and formed in the form of a wave in the circumferential direction so as to be in contact with the guide portion 38a and the hub portion 25a alternately (see FIG. 32). Assuming that a thickness of the elastic member 52 is d and a distance between the guide portion 38a and the hub portion 25a is D, a permissible micro displacement of the hub portion 25a against the guide portion 38a is D-d. A load characteristic of the elastic member 52 is shown in FIG. 33. The displacement rate is large in a region the load is small and the displacement rate is small in a region the load is large compared with a load characteristic of a standard elastic member (the displacement is proportional to the load) and when the displacement reaches D-d, no further displacement occurs. Other structure is the same as example 11. Such an elastic member 52 can be applied to other examples.

According to example 27, it has the same effect as example 11 (example 9) and since the elastic member 52 permits a micro displacement of the hub member 25 with generating a resisting force, eccentricity can be reduced or suppressed and unbalanced force occurred at one of the bearings caused by three-point support of the rotating shaft 7 of motor side can be suppressed and thus a lifetime of the apparatus is not reduced.

It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modification aforementioned.

What is claimed is:

1. A torque fluctuation absorber, comprising:
a flywheel fixed on a first rotating shaft by a fixation member,
a damper unit connected with a second rotating shaft and for absorbing fluctuation of a torque occurred between the first rotating shaft and the second rotating shaft by elastic force,
a limiter unit provided on a power transmission path between the flywheel and the damper unit, wherein the limiter unit induces a slide when the fluctuation of the torque exceeded a predetermined value, and
a predetermined member rotating with the first rotating shaft on a power transmission path between the first rotating shaft and the limiter unit, wherein the predetermined member has a guide portion that prevents movement of the damper unit in a transverse direction to a rotating axis, and wherein the guide portion is provided at radially internal side of the fixation member, the predetermined member being a guide member made of an elastic body which is fixed on the first rotating shaft, wherein the damper unit comprises a plate member connected to the limiter unit, and a hub member connected to the second rotating shaft, and the guide portion contacts both the plate member and the hub member and prevents movement of both the plate member and the hub member in a direction transverse to the rotating axis.

2. The torque fluctuation absorber according to claim 1, wherein the first rotating shaft comprises a cylindrical elongated portion extending toward the damper unit, and wherein the guide member is attached at an outer or internal circumference of the elongated portion.

3. The torque fluctuation absorber according to claim 1, wherein the guide member is fixed to the first rotating shaft by the fixation member with the flywheel to be coaxial with the first rotating shaft.

4. The torque fluctuation absorber according to claim 1, wherein the guide member has a slit or a cavity at the guide portion.

5. The torque fluctuation absorber according to claim 1, wherein the guide member permits a predetermined displacement of the damper unit in a transverse direction to the rotating axis of the predetermined member while generating a resisting force against movement of the damper unit.

6. A torque fluctuation absorber, comprising:

a flywheel fixed on a first rotating shaft by a fixation member, a damper unit connected with a second rotating shaft and for absorbing fluctuation of a torque occurred between the first rotating shaft and the second rotating shaft by elastic force, a limiter unit provided on a power transmission path between the flywheel and the damper unit, wherein the limiter unit induces a slide when the fluctuation of the torque exceeded a predetermined value, and a predetermined member rotating with the first rotating shaft on a power transmission path between the first rotating shaft and the limiter unit, wherein the predetermined member has a guide portion that prevents movement of the damper unit in a transverse direction to a rotating axis, and wherein the guide portion is provided at radially internal side of the fixation member, wherein the damper unit comprises a plate member connected to the limiter unit, and a hub member connected to the second rotating shaft, and the guide portion contacts both the plate member and the hub member and prevents movement of both the plate member and the hub member in a direction transverse to the rotating axis, wherein the guide portion is formed cylindrically and has a penetration hole portion.

7. The torque fluctuation absorber according to claim 6, wherein the guide portion has a tapered portion or a step portion that increases in diameter in accordance with a position from the damper unit to the flywheel at the damper unit side of the penetration hole portion.

8. The torque fluctuation absorber according to claim 6, wherein the penetration hole portion is a radially extending penetration hole portion that penetrates both a radially inwardly facing inner circumference side of the guide and a radially outwardly facing outer circumference side of the guide.

* * * * *